(12) United States Patent
Brock et al.

(10) Patent No.: US 11,215,147 B2
(45) Date of Patent: Jan. 4, 2022

(54) FUEL TANK PRESSURE REGULATOR

(71) Applicant: Stant USA Corp., Connersville, IN (US)

(72) Inventors: Michael S. Brock, Connversville, IN (US); Kevin L. Young, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 17/175,638

(22) Filed: Feb. 13, 2021

(65) Prior Publication Data

US 2021/0254583 A1  Aug. 19, 2021

Related U.S. Application Data

(60) Provisional application No. 62/976,502, filed on Feb. 14, 2020.

(51) Int. Cl.
*F02M 25/08* (2006.01)
*B60K 15/035* (2006.01)

(52) U.S. Cl.
CPC ..... *F02M 25/089* (2013.01); *B60K 15/03504* (2013.01); *B60K 15/03519* (2013.01); *F02M 25/0836* (2013.01); *F02M 25/0854* (2013.01); *B60K 2015/03514* (2013.01); *B60K 2015/03585* (2013.01); *F02M 2025/0845* (2013.01)

(58) Field of Classification Search
CPC ............ F02M 25/089; F02M 25/0836; F02M 25/0854; F02M 2025/0845; B60K 15/03519; B60K 15/03504; B60K 2015/03514; B60K 2015/03585
See application file for complete search history.

(56) References Cited

U.S. PATENT DOCUMENTS

| | | | |
|---|---|---|---|
| 4,392,507 A | 7/1983 | Harris | |
| 4,715,403 A | 12/1987 | Szlaga | |
| 4,742,844 A | 5/1988 | Szlaga | |
| 4,805,663 A | 2/1989 | Szlaga | |
| 5,069,188 A | 12/1991 | Cook | |
| 5,388,611 A | 2/1995 | Harris | |
| 5,419,367 A | 5/1995 | Noya | |
| 5,535,772 A * | 7/1996 | Roetker | B60K 15/03519 137/202 |
| 5,584,278 A | 12/1996 | Satoh | |
| 5,605,177 A | 2/1997 | Ohashi | |

(Continued)

FOREIGN PATENT DOCUMENTS

| | | |
|---|---|---|
| CN | 211203006 | 8/2020 |
| EP | 3908616 A2 | 4/1999 |

(Continued)

OTHER PUBLICATIONS

PCT International Search Report and Written Opinion completed by the ISA/KR on 28MAY2021 and issued in connection with PCT/US2021/018062.

*Primary Examiner* — Xiao En Mo
(74) *Attorney, Agent, or Firm* — Barnes & Thornburg LLP

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

35 Claims, 14 Drawing Sheets

(56) References Cited

U.S. PATENT DOCUMENTS

| | | | |
|---|---|---|---|
| 5,694,968 A * | 12/1997 | Devall | B60K 15/03519 137/202 |
| 6,003,499 A | 12/1999 | Devall et al. | |
| 6,386,222 B1 | 5/2002 | Harris | |
| 6,481,592 B2 | 11/2002 | Harris | |
| 6,526,951 B2 | 3/2003 | Ishigaki | |
| 6,561,211 B2 | 5/2003 | Devall | |
| 6,584,704 B2 | 7/2003 | March et al. | |
| 6,601,569 B2 | 8/2003 | Weldon et al. | |
| 6,779,544 B2 | 8/2004 | Devall | |
| 6,844,561 B1 | 1/2005 | Rusnak et al. | |
| 7,270,117 B1 | 9/2007 | Devall | |
| 7,325,577 B2 | 2/2008 | Devall | |
| 7,503,314 B2 | 3/2009 | Achor | |
| 7,556,067 B2 | 7/2009 | McClung | |
| 7,568,494 B2 | 8/2009 | Devall | |
| 7,591,281 B2 | 9/2009 | Tsuge | |
| 7,654,403 B2 * | 2/2010 | DeCapua | B60K 15/0406 220/203.23 |
| 7,823,610 B2 | 11/2010 | King | |
| 8,573,255 B2 | 11/2013 | Pifer | |
| 8,578,914 B2 | 11/2013 | Lee et al. | |
| 8,833,573 B2 | 9/2014 | Tomaszewski et al. | |
| 8,944,100 B2 | 2/2015 | Piter et al. | |
| 9,359,977 B2 | 6/2016 | Brock et al. | |
| 9,371,803 B2 | 6/2016 | Piter et al. | |
| 9,500,291 B2 | 11/2016 | Piter et al. | |
| 9,873,320 B2 | 1/2018 | Young | |
| 9,902,258 B2 | 2/2018 | Young et al. | |
| 10,458,366 B2 * | 10/2019 | Brock | B60K 15/03504 |
| 2002/0088494 A1 * | 7/2002 | Weldon | F02M 25/0836 137/493.7 |
| 2002/0144730 A1 * | 10/2002 | Brock | B60K 15/03519 137/202 |
| 2005/0279406 A1 | 12/2005 | Atwood et al. | |
| 2006/0070656 A1 * | 4/2006 | Crawford | B60K 15/03519 137/202 |
| 2006/0185735 A1 | 8/2006 | Tsuge | |
| 2007/0261752 A1 | 11/2007 | McClung et al. | |
| 2016/0298778 A1 | 10/2016 | Young | |
| 2016/0311315 A1 * | 10/2016 | Young | B60K 15/03519 |

FOREIGN PATENT DOCUMENTS

| | | | |
|---|---|---|---|
| JP | 2013170506 | | 9/2013 |
| KR | 10-107623 | B1 | 10/2011 |
| WO | 2010122414 | | 10/2010 |
| WO | 2012-014061 | A1 | 2/2012 |

* cited by examiner

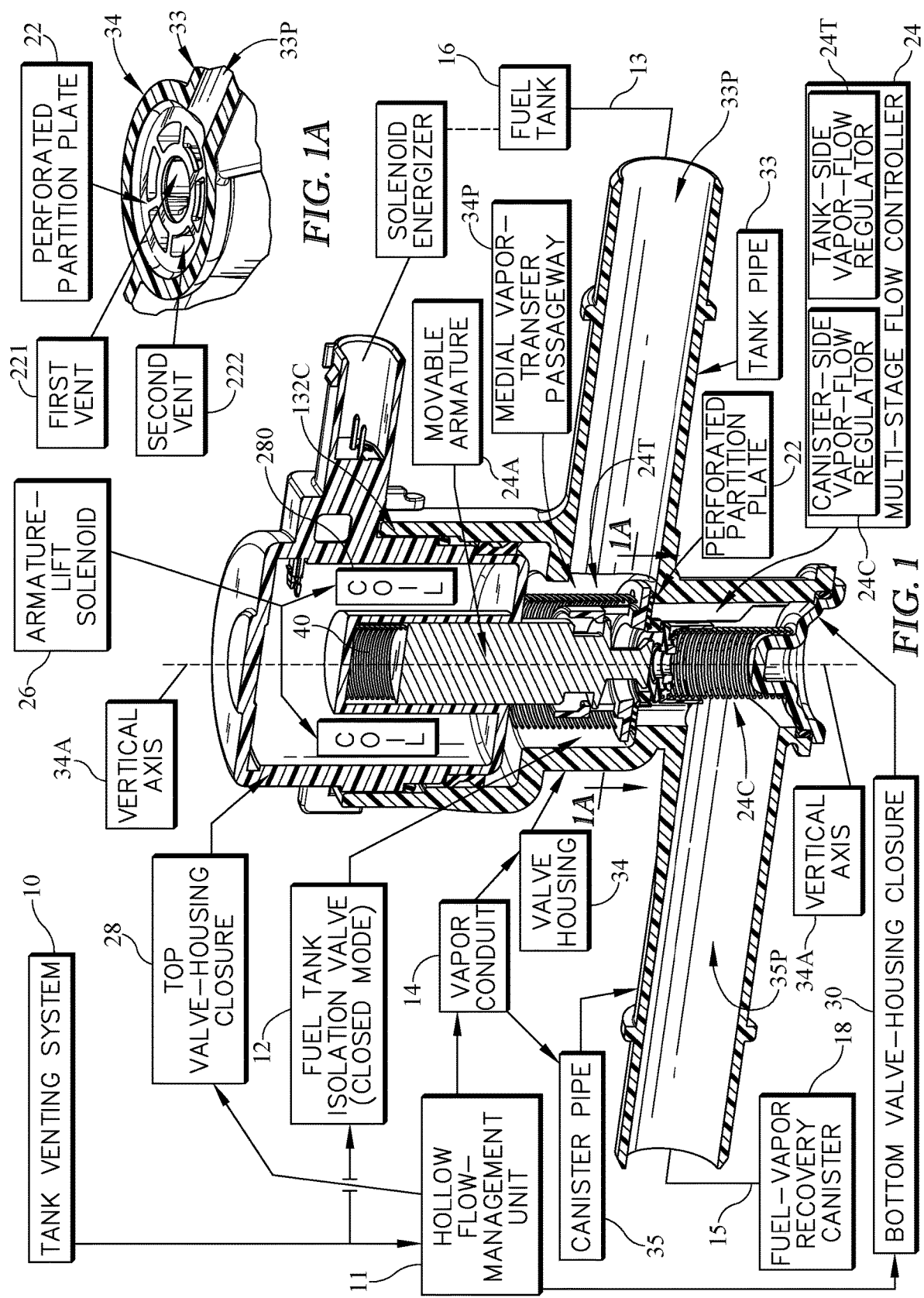

FUEL TANK PRESSURE REGULATOR

PRIORITY CLAIM

This application claims priority under 35 U.S.C. § 119(e) to U.S. Provisional Patent Application 62/976,502 filed Feb. 14, 2020, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a solenoid-activated fuel tank vent valve.

Vehicle fuel systems include valves associated with a fuel tank and configured to vent pressurized or displaced fuel vapor from the vapor space in the fuel tank to a fuel-vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

SUMMARY

A tank venting system in accordance with the present disclosure includes vapor flow controllers for regulating flow of fuel vapor between a fuel tank and a fuel-vapor recovery system in a vehicle. The flow of fuel vapor is controlled to maintain the pressure of fuel vapor in the fuel tank at a certain pressure level or within a certain pressure range.

In illustrative embodiments, the tank venting system includes a fuel tank-isolation valve located in a medial vapor-transfer passageway formed in a hollow flow-management unit that is configured to conduct fuel vapor back and forth between a fuel tank and a fuel-vapor recovery canister onboard a vehicle. The medial vapor-transfer passageway is formed in a valve housing of a vapor conduit that is included in the hollow flow-management unit to interconnect a tank passageway formed in the flow-management unit to communicate with the fuel tank and a canister passageway formed in the flow-management unit to communicate with the fuel-vapor recovery canister. The vapor conduit comprises a tank pipe providing the tank passageway, a canister pipe providing the canister passageway, and the valve housing that provides the medial vapor-transfer passageway.

In illustrative embodiments, the fuel tank isolation valve has normally CLOSED mode to block fuel vapor flow between the tank and canister passageways through the medial vapor-transfer passageway formed in the valve housing. The fuel tank isolation valve also has four different OPENED modes to regulate flow of fuel vapor through the medial vapor-transfer passageway between the fuel tank and the fuel-vapor recovery canister. The FIRST and SECOND OPENED modes are used during fuel tank refueling to conduct displaced fuel vapor from the fuel tank to the fuel-vapor recovery canister through the medial vapor-transfer passageway. The THIRD OPENED mode is used to conduct atmospheric air that is drawn by a vacuum in the fuel tank through the fuel-vapor recovery canister to form a flow of fuel vapor through the medial vapor-transfer passageway into the fuel tank to alleviate unwanted vacuum conditions in the fuel tank. And the FOURTH OPENED mode is used to conduct high-pressure fuel vapor discharged from the fuel tank through the medial vapor-transfer passageway into the fuel-vapor recovery canister to alleviate unwanted over-pressure conditions in the fuel tank.

In illustrative embodiments, the fuel tank isolation valve includes a stationary perforated partition plate and a movable multi-stage flow controller that is able to move relative to the stationary perforated partition plate. The perforated partition plate is coupled to the valve housing to partition the medial vapor-transfer passageway to establish on one side of the perforated partition plate a tank-side chamber opening into the tank passageway and on the other side of the perforated partition plate a canister-side chamber opening into the medial vapor-transfer passageway.

In illustrative embodiments, the partition plate is perforated to form a first vent interconnecting the tank-side and canister-side chambers in fluid communication and a different second vent also interconnecting the tank-side and canister-side chambers in fluid communication. In the normally CLOSED mode of the fuel tank isolation valve, both of the first and second vents are closed by the multi-stage flow controller. In the FIRST OPENED mode of the fuel tank isolation valve, a small BLEED stream of pressurized fuel vapor is allowed to flow from the fuel tank to the fuel-vapor recovery canister through a first partly opened first vent during an early stage of refueling of the fuel tank. In the SECOND OPENED mode of the fuel tank isolation valve, a relatively larger DISCHARGE stream of pressurized fuel vapor is allowed to flow from the fuel tank to the fuel-vapor recovery canister through a relatively greater second partly opened first vent during a later stage of fuel tank refueling. In the THIRD OPENED mode of the fuel tank isolation valve, pressurized fuel vapor from the fuel-vapor recovery canister can flow to the fuel tank through an opened second vent while the first vent is closed when unwanted vacuum conditions are present in the fuel tank. And in the FOURTH OPENED mode of the fuel tank isolation valve pressurized fuel vapor from the fuel tank can flow to the fuel-vapor recovery canister through a different third partly opened first vent while the second vent is closed when unwanted over-pressure conditions are present in the fuel tank.

In illustrative embodiments, the perforated partition plate is formed to include a central vent aperture establishing a first vent configured to conduct fuel vapor between the tank-side and canister-side chambers during transit of fuel vapor between the fuel tank and the fuel-vapor recovery canister. The perforated partition plate is also formed to include several relatively smaller orbital vent apertures surrounding the central vent aperture. The orbital vent apertures cooperate to establish a second vent configured to conduct fuel vapor between the tank-side and canister-side chambers during transit of fuel vapor between the fuel tank and the vapor-recovery canister.

In illustrative embodiments, the multi-stage flow controller includes a tank-side vapor-flow regulator, a canister-side vapor flow regulator, and a solenoid-activated spring-biased movable armature mounted for movement in an armature-receiving channel formed in the tank-side vapor-flow regulator. Each of the movable armature and the tank-side and canister-side vapor-flow regulators of the multi-stage flow controller is mounted for independent movement relative to the stationary perforated partition plate in the medial vapor-transfer passageway formed in the valve housing of the hollow flow-management unit along a single vertical axis extending through the valve housing to regulate flow of fuel vapor between the fuel tank and the fuel-vapor recovery canister through one or both of the first and second vents formed in the stationary perforated partition plate.

In illustrative embodiments, the fuel tank isolation valve changes from its normally CLOSED mode closing the first and second vents formed in the stationary perforated partition plate in a sequence to a FIRST OPENED mode and then to a SECOND OPENED mode during early and later stages of a tank refueling activity to vent displaced fuel vapor from the fuel tank to the fuel-vapor recovery canister through the vapor conduit of the hollow flow-management unit. In the FIRST OPENED mode of the fuel tank isolation valve, the solenoid is energized to move the movable armature upwardly along the single vertical axis to disengage the underlying canister-side vapor-flow regulator so as to allow a BLEED flow stream of pressurized fuel vapor to flow from the fuel tank via the tank pipe and the canister pipe to the fuel-vapor recovery canister through a central vent aperture (first vent) formed in the perforated partition plate and a vapor-flow orifice that is formed in the canister-side vapor-flow regulator to align with the central vent aperture when the canister-side vapor-flow regulator engages the underside of the perforated partition plate. In the SECOND OPENED mode of the fuel tank isolation valve, the solenoid is energized further to move the movable armature upwardly away from the stationary perforated partition plate and such movement causes a lift flange included in the movable armature to engage a companion lift catch included in the tank-side vapor-flow regulator to apply a lifting force to remaining portions of the tank-side vapor-flow regulator to lift portions of the tank-side vapor-flow regulator away from the topside of the perforated partition plate so as to disengage the underlying perforated partition plate to allow additional flow of pressurized fuel vapor from the tank pipe to the canister pipe through a series of orbital vent apertures (second vent) that are formed in the perforated partition plate and arranged to surround the central vent aperture (first vent) while the first vent is partly opened.

In illustrative embodiments, the fuel tank isolation valve changes from its normally CLOSED mode to a THIRD OPENED mode during development of unwanted vacuum conditions in the fuel tank to allow fuel vapor including air from the atmosphere to flow from the fuel-vapor recovery canister to the fuel tank through the medial vapor-flow passageway formed in the vapor conduit of the hollow flow-management unit. In the THIRD OPENED mode of the fuel tank isolation valve, the solenoid is not energized but fuel vapor moving in the canister pipe into the medial vapor-transfer passageway is able to reach the underside of the tank-side vapor-flow regulator through the orbital vent apertures (second vent) formed in the perforated partition plate and exert an upward lifting force on the tank-side of the vapor-flow regulator to cause the tank-side vapor-flow regulator to move upwardly and disengage the topside perforated partition plate so that fuel vapor from the canister pipe can flow through the opened orbital vent apertures (second vent) into the tank pipe and then flow into the fuel tank to dissipate the unwanted vacuum conditions in the fuel tank while the first vent remains closed by cooperative action of the movable armature and the canister-side vapor-flow regulator.

In illustrative embodiments, the fuel tank isolation valve changes from its normally CLOSED mode to a FOURTH OPENED mode during development of unwanted overpressure conditions in the fuel tank to allow pressurized fuel vapor in the fuel tank to flow from the fuel tank to the fuel-vapor recovery canister through the medial vapor-transfer passageway formed in the vapor conduit of the hollow flow-management unit. In the FOURTH OPENED mode, the solenoid is not energized but pressurized fuel vapor from the fuel tank that is extant in the tank pipe is able to reach the topside of the canister-side vapor-flow regulator owing to a partial opening of the first vent and exert a downward pushing force on the canister-side vapor-flow regulator to cause the canister-side vapor-flow regulator to move downwardly to disengage the underside of the perforated partition plate so that over-pressure fuel vapor from the fuel tank can flow through the partly opened central vent aperture (second vent) into the canister pipe and then flow to the fuel-vapor recovery canister to dissipate unwanted overpressure conditions in the fuel tank.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 1 is a sectional perspective view of a tank venting system in accordance with the present disclosure comprising a hollow flow-management unit providing a vapor conduit including a canister pipe coupled to a fuel-vapor recovery canister, a tank pipe coupled to a fuel tank, and a valve housing formed to include a vertically extending medial vapor-transfer passageway interconnecting vapor-conducting passageways formed in the canister and tank pipes and further comprising a fuel tank isolation valve located in the medial vapor-transfer passageway formed in the valve housing and showing that the fuel tank isolation valve includes a stationary perforated partition plate coupled to the valve housing and a multi-stage flow controller including components that are able to move relative to the stationary perforated partition plate for normally closing, partly opening, and opening vent apertures formed in the perforated partition plate in different operating modes of the fuel tank isolation valve to regulate flow of fuel vapor between the fuel tank and the fuel-vapor recovery canister;

FIG. 1A is an enlarged perspective view of the stationary perforated partition plate of the fuel tank isolation valve showing how the plate is coupled to the valve housing;

FIG. 4A is an enlarged view taken from the circled region of FIG. 4 showing normal closure of the first and second vents formed in the stationary perforated partition plate in the normally CLOSED mode of the fuel tank isolation valve;

FIG. 4B is an enlarged sectional view taken along line 4B-4B of FIG. 4 showing that the stationary perforated partition plate is formed to include a large-diameter central vent aperture establishing the first vent and six relatively smaller oblong arc-shaped orbital vent apertures surrounding the central vent aperture and establishing the second vent;

FIG. 6A is an enlarged view taken from the circled region of FIG. 6 showing flow of the BLEED stream of pressurized fuel vapor through the FIRST partly opened first vent around the distal tip of the movable armature while the canister-side vapor-flow regulator remains engaged to an underside of the stationary perforated partition plate to align a vapor-flow orifice formed in the canister-side vapor-flow regulator with the central vent aperture formed in the stationary perforated partition plate;

DETAILED DESCRIPTION

Figure 2A:
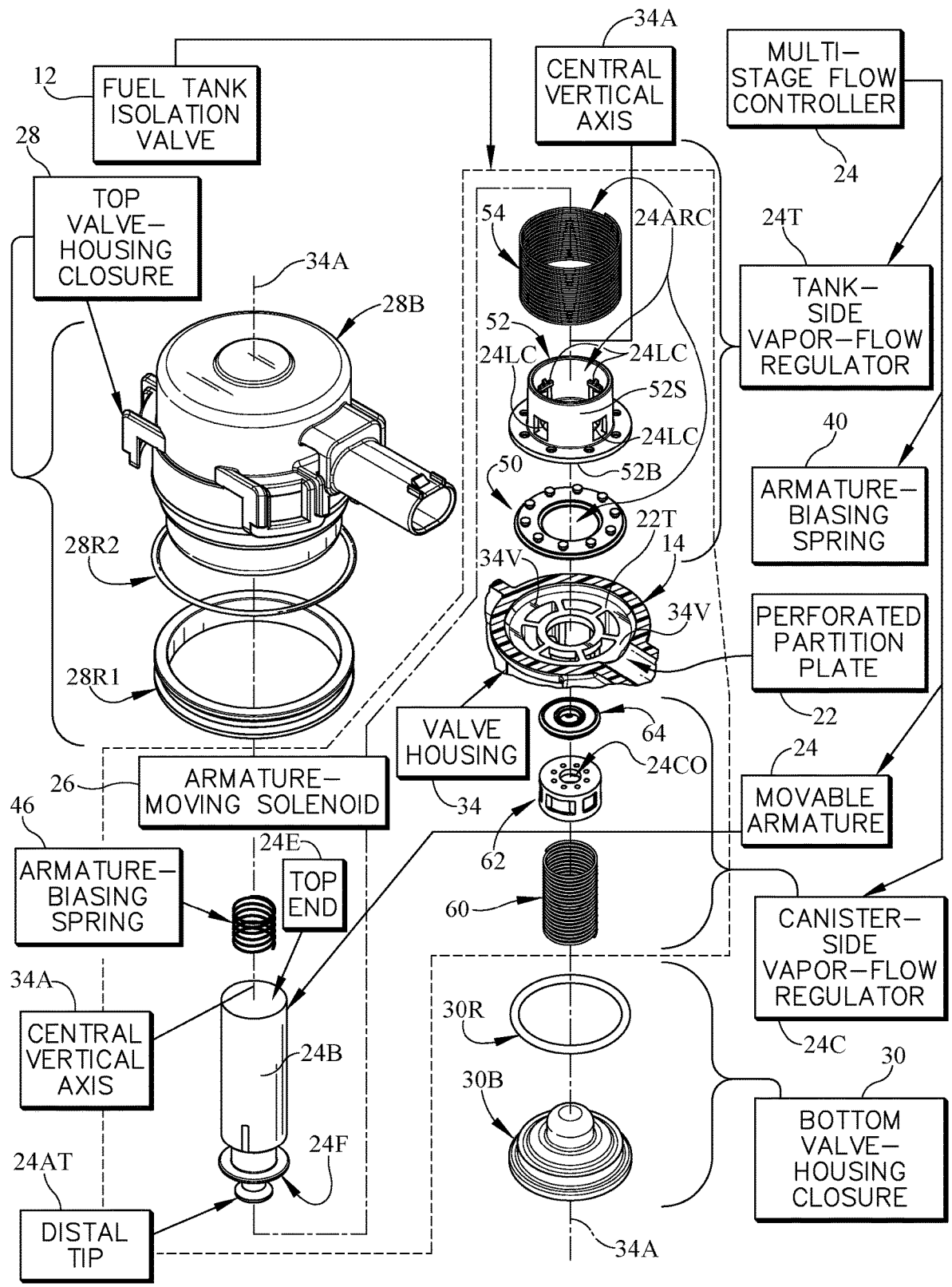
FIG. 2A is an exploded perspective assembly view of components included in the fuel tank isolation valve along with portions of the hollow flow-management unit that cooperate to form boundaries of the vertical medial vapor-transfer passageway that contains the fuel tank isolation valve and showing that those portions include a valve housing, a top valve-housing closure, and a bottom valve-housing closure.

Fuel tank venting system 10 comprises a hollow flow-management unit 11 and a fuel tank isolation valve 12 associated with that unit 11 as suggested in FIG. 1. Hollow-flow-management unit 11 includes a vapor conduit 14 that interconnects a fuel tank 16 and a fuel-vapor recovery canister 18 in fluid communication so that fuel vapor can flow back and forth between the fuel tank 16 and fuel-vapor recovery canister 18 through several passageways formed in a vapor conduit 14 included in the hollow flow-management unit 11. Fuel tank venting system 10 is used to control flow of air and fuel vapor between fuel tank 16 and an emission control system including a fuel-vapor recovery canister 18 as suggested in the drawings. System 10 is used onboard a vehicle (not shown) including an engine 20 and a purge vacuum source (not shown) coupled to engine 20 and canister 18 as shown, for example, in FIG. 3.

Fuel tank isolation valve 12 is configured in accordance with the present disclosure normally to isolate fuel tank 16 from fuel-vapor recovery canister 18 to block flow of fuel vapor between tank 16 and canister 18. Fuel tank isolation valve 12 is configured to have four opened modes to allow for temporary fuel vapor flow between tank 16 and canister 18 during four different tank events.

In vehicles with a normal internal combustion engine, the fuel vapor from the fuel tank is vented directly to the surrounding atmosphere. Directly venting the fuel vapor to the surrounding atmosphere may be harmful to people and/or the environment.

However, in partially hybrid electric vehicles (PHEV), the internal combustion engine included in the vehicle operates intermittently and therefore the fuel tank system is frequently closed off from the atmosphere when not in use (i.e. the engine is not being used). Closing the system off from the atmosphere may reduce the harmful emissions to the surrounding environment, but may create a need to control/regulate the fuel vapor in the system.

The fuel vapor in the fuel tank may therefore be at a higher pressure or a lower vacuum pressure than normal engines, which may make opening fuel system lines when ready for use a challenge. Further, if the increased pressure in the fuel tank is not released, the fuel tank may become damaged or even explode. Fuel tank isolation valve 12 controls the flow fuel vapor and air between fuel tank 16 and fuel-vapor recovery canister 18 used to store the pressurized fuel vapor to release built up pressure in fuel tank 16 at different stages.

Fuel tank isolation valve 12 is shown in a normally CLOSED first mode to block flow of fuel vapor between fuel tank 16 and fuel-vapor recovery canister 18 in FIGS. 1, 3, and 4-4B. Fuel tank isolation valve 12 is shown in a FIRST OPENED mode to vent some displaced fuel vapor from fuel tank 16 during an early stage of fuel tank refueling when a person uses a fuel-dispersing pump nozzle (not shown) to discharge fuel into a filler neck leading to the fuel tank in FIGS. 5, 6, and 6A. Fuel tank isolation valve 11 is shown in a SECOND OPENED mode to vent more displaced fuel vapor from fuel tank 16 during a later stage of fuel tank refueling in FIGS. 7 and 8. Fuel tank isolation valve 12 is shown in a THIRD OPENED mode to alleviate unwanted vacuum conditions in fuel tank 16 in FIGS. 9 and 10. And fuel tank isolation valve 12 is shown in a FOURTH OPENED mode to alleviate unwanted over-pressure conditions in fuel tank 16 in FIGS. 11 and 12.

Fuel tank isolation valve 12 regulates fuel vapor flow through vapor conduit 14 to regulate pressure of fuel vapor within fuel tank 16 in accordance with predetermined pressure targets as suggested in FIGS. 3, 5, 7, 9, and 11. Fuel tank isolation valve 12 includes a stationary perforated partition plate 22 mounted in vapor conduit 14 and a multi-stage flow controller 24 that is mounted for movement in vapor conduit 14 alongside and relative to perforated partition plate 22 to regulate flow of fuel vapor through separate first and second vents 221, 222 formed in perforated partition plate 22. Fuel tank isolation valve 12 also includes a solenoid 26 for use with multi-stage flow controller 24 during tank refueling activities. Solenoid 26 can be energized during the FIRST and SECOND OPENED modes of fuel tank isolation valve 12 as suggested in FIGS. 5 and 7.

Vapor conduit 14 of the hollow flow-management unit 11 is formed as suggested in FIG. 1 to include a horizontally extending tank pipe 33 coupled to fuel tank 16 via tank conduit 13, a horizontally extending canister pipe 35 coupled to fuel-vapor recovery canister 18 via canister conduit 15, and a valve housing 34 providing a vertically extending medial vapor-transfer passageway 34P interconnecting a tank passageway 33P formed in tank pipe 33 and a canister passageway 35P formed in canister pipe 35 in fluid communication. Vapor conduit 14 also includes a top valve-housing closure 28 for closing an opened top end of valve housing 34 and a bottom valve-housing closure 30 for closing an opened bottom end of valve housing 34 as shown in FIG. 1.

Figure 4:
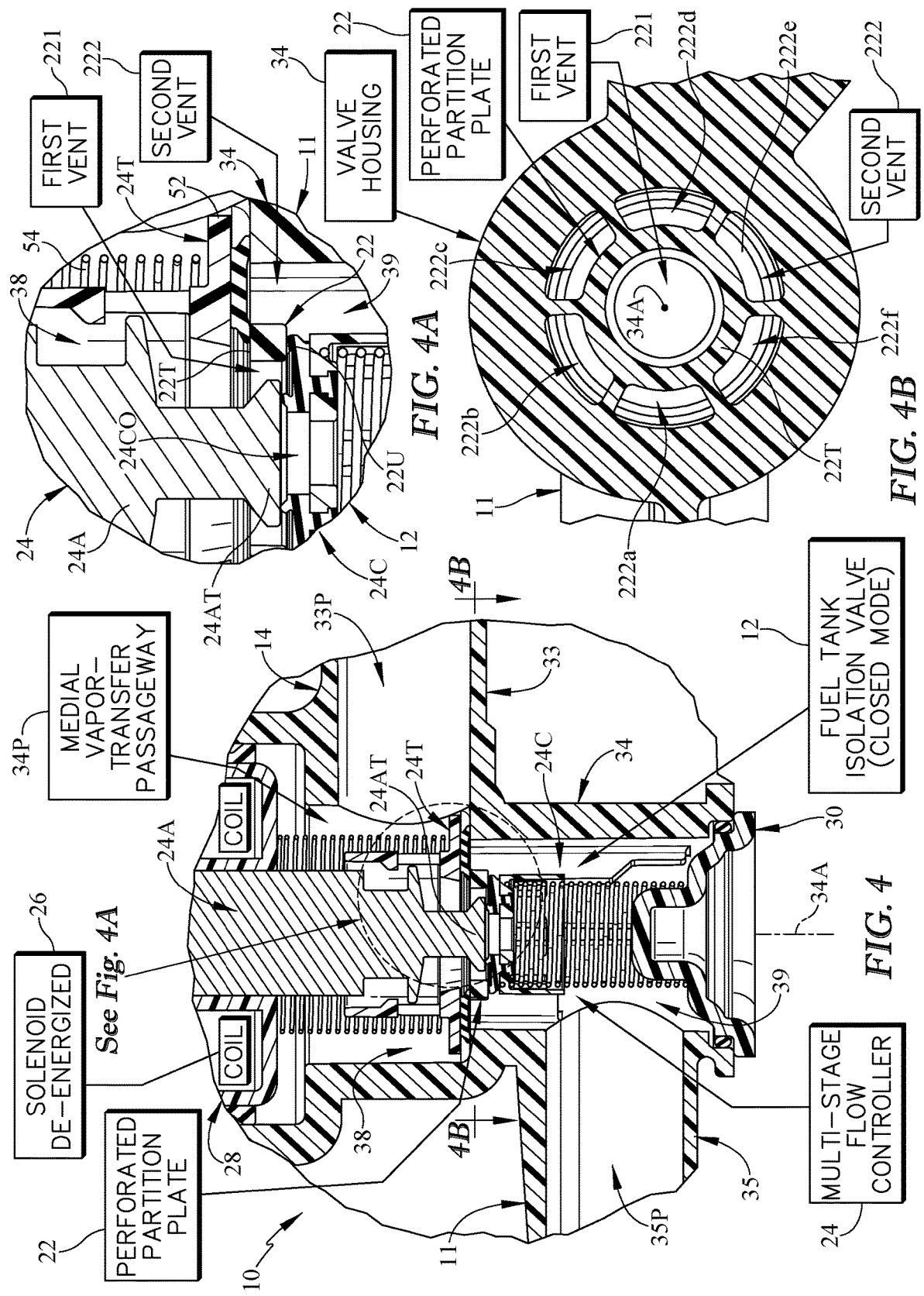
FIG. 4. is an enlarged view taken from the circled region of FIG. 3 to show normal closure of first and second vents (see FIG. 4B) formed in the stationary perforated partition plate of the fuel tank isolation valve and shown in more detail in FIGS. 1A and 4B when the fuel tank isolation valve is in the normally CLOSED mode.

Perforated partition plate 22 of fuel tank isolation valve 12 is located in the medial vapor-transfer passageway 34P formed in valve housing 34 as shown in FIGS. 1 and 4. Perforated partition plate 22 is coupled to vapor conduit 14 to partition the medial vapor-transfer passageway 34P to define a tank-side chamber 38 above perforated partition plate 22 for conducting fuel vapor between the tank passageway 33P and the first and second vents 221, 222 formed in perforated partition plate 32 and a canister-side chamber 39 below perforated partition plate 22 for conducting fuel vapor between the canister passageway 35P and the first and second vents 221, 222.

Figure 3:
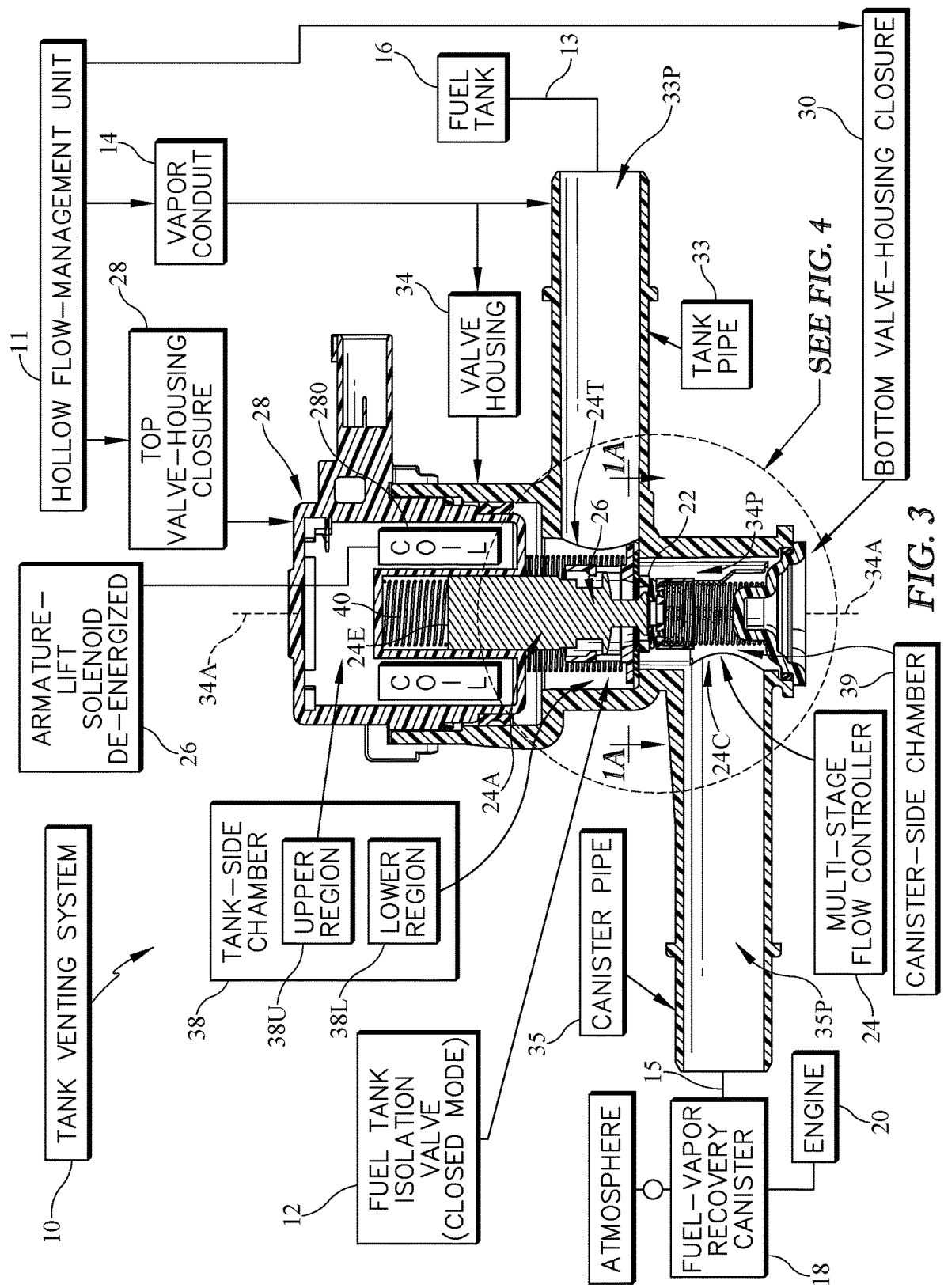
FIG. 3 is a sectional side elevation view of the tank venting system of FIG. 1 showing the fuel tank isolation valve in a normally CLOSED mode and showing that the multi-stage flow controller includes a tank-side vapor-flow regulator located in a lower region of the tank-side chamber above the stationary perforated partition plate, a canister-side vapor-flow regulator located in the canister-side chamber below the stationary perforated partition plate, and a solenoid-activated spring-based movable armature extending downwardly from an upper region of the tank-side chamber into the lower region of the tank-side chamber through an armature-receiving channel formed in the tank-side vapor-flow regulator to cause a distal tip of the movable armature to close a vapor-flow orifice formed in the canister-side vapor-flow regulator, and also showing that the multi-stage flow controller further includes an armature-moving solenoid having a coil located in the upper region of the tank-side chamber to surround an upper portion of the movable armature.

Multi-stage flow controller 24 is configured as shown in FIGS. 1, 3, and 4 normally to engage perforated partition plate 22 to close the first and second vents 221, 222 formed in perforated partition plate 22 so as to block fuel vapor flow from tank pipe 33 to canister pipe 35 through the medial vapor-transfer passageway 34P formed in valve housing 34 of vapor conduit 14 of the hollow flow-management unit 11 so that fuel tank 16 is normally isolated from fluid communication with fuel-vapor recovery canister 18. However, multi-stage flow controller 24 is configured in accordance with the present disclosure to disengage from perforated partition plate 22 in several different ways as shown in FIGS. 6, 8, 10, and 12 to regulate flow of fuel vapor in vapor conduit 14 between fuel tank 16 and fuel-vapor recovery canister 18 independently through a central vent aperture 221 formed in perforated partition plate 22 to establish first vent 221 and also through several orbital vent apertures 222*a-f* (see FIG. 4B) formed in perforated partition plate 22 to establish second vent 222 and surround central vent aperture 221 during (1) early and later stages of fuel tank 16 refueling activity shown in FIGS. 6 and 8, (2) development of unwanted vacuum conditions in fuel tank 16 shown in FIG. 10, and (3) development of unwanted over-pressure conditions in fuel tank 16 shown in FIG. 12.

Multi-stage flow controller 24 includes a tank-side vapor-flow regulator 24T that is located above perforated partition plate 22 in the tank-side chamber 38 that is formed in the medial vapor-transfer passageway 34P of valve housing 34 as suggested in FIGS. 1 and 4 to communicate fuel vapor to and from fuel tank 16 via tank pipe 33 coupled to fuel tank 16, multi-stage from controller 24 also includes a canister-side vapor-flow regulator 24C that is located under perforated partition plate 22 in the canister-side chamber 39 that is formed in the medial vapor-transfer passageway 34P of valve housing 34 to communicate fuel vapor to and from fuel-vapor recovery canister 18 via canister pipe 35 coupled to fuel-vapor recovery canister 18. Each of tank-side and canister-side vapor-flow regulators 24T, 24C is aligned to move upwardly and downwardly relative to perforated partition plate 22 along a single vertical axis 34A that extends through the medial vapor-transfer passageway 34P formed in vapor conduit 14.

By aligning each of tank-side and canister-side vapor-flow regulators 24T, 24C along single vertical axis 34A in the medial vapor-transfer passageway 34P, the space needed to house fuel tank isolation valve 12 may be reduced. The arrangement of the regulators 24T, 24C along the axis 34A may also provide benefits in manufacturing and packaging.

Multi-stage flow controller 24 also includes a spring-biased movable armature 24A that is operationally coupled to solenoid 26 and is arranged to extend into the medial vapor-transfer passageway 34P as shown in FIGS. 1 and 3 and move relative to the stationary perforated partition plate 22 along the single vertical axis 34A that extends through the tank-side chamber 38, the central vent aperture 221 formed in perforated partition plate 22, and the canister-side chamber 39. Movable armature 24A cooperates with tank-side and canister-side vapor-flow regulators 24T, 24C when fuel tank isolation valve 12 is in a normal CLOSED mode as shown in FIGS. 1, 3, and 4 to block flow of fuel vapor through the central and orbital vent apertures 221, 222 formed in perforated partition plate 22 so that fuel vapor cannot flow through the vapor conduit 14 between fuel tank 16 and fuel-vapor recovery canister 18 and therefore the fuel tank 16 normally is isolated from the vapor-recovery canister 18.

Tank-side and canister-side vapor-flow regulators 24T, 24C are configured to move in the medial vapor-transfer passageway 34P relative to the stationary perforated partition plate 22 to close, partly open, and open vents 221, 222 formed in perforated partition plate 22 in response to changes in pressure of fuel vapor extant in the medial vapor-transfer passageway 34P and in fuel tank 16. Movable armature 24A is spring-biased by spring 40 normally to move toward canister-side vapor-flow regulator 24C and is operationally linked to solenoid 26 to move upwardly way from canister-side vapor flow regulator 24C when solenoid 26 is energized. Movable armature 24A includes a distal tip 24AT that is arranged to extend into the medial vapor-transfer passageway 34P and move therein in response to a pushing force generated by an armature-moving spring 40 and actuation of solenoid 26 to assume various positions therein to cooperate with canister-side vapor-flow regulator 24C so as to close or partly open the first vent 221 formed in the perforated partition plate 22.

A normally CLOSED mode of fuel tank isolation valve 12 is established as shown in FIGS. 1, 3, 4, and 4A when tank-side vapor-flow regulator 24T engages a topside 22T of perforated partition plate 22 to close second vent 222 and distal tip 24AT of movable armature closes a vapor-flow orifice formed 24CO in canister-side vapor-flow regulator 24C while canister-side vapor-flow regulator 24C engages an underside 22O of perforated partition plate 22. As suggested in FIGS. 3 and 4, solenoid 26 is de-energized in the FIRST OPENED mode while armature-moving spring 40 is arranged to engage a top end of movable armature 24A and act against top valve-housing closure 28 to yieldably move movable armature 24A downwardly to cause distal tip 24AT to engage canister-side vapor-flow regulator 24C and close the vapor-flow orifice 24CO formed in canister-side vapor-flow regulator 24C.

Figure 5:
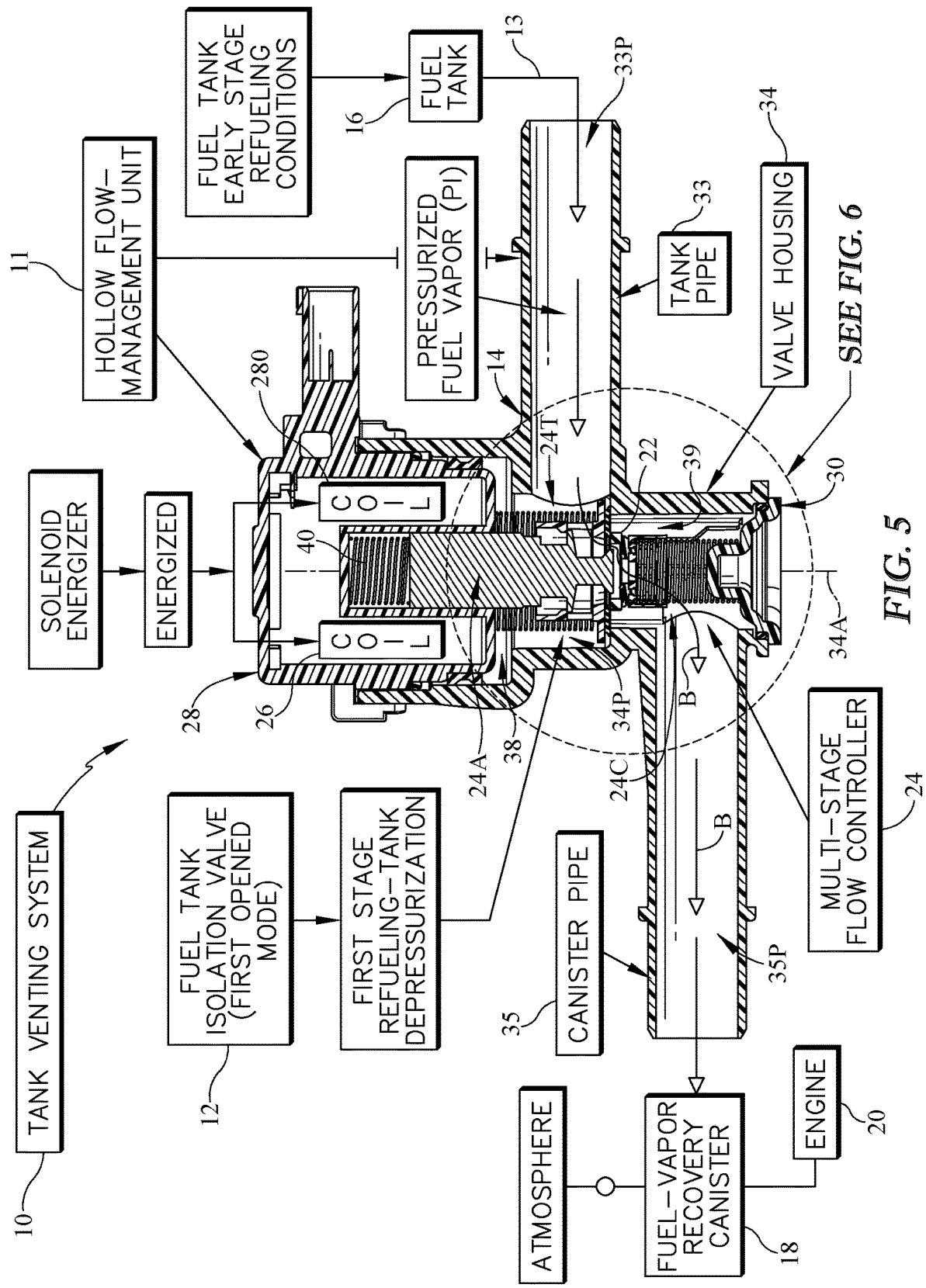
FIG. 5 is a view similar to FIG. 3 showing the fuel tank isolation valve in a FIRST OPENED mode during an early stage of fuel tank refueling to allow a BLEED stream of pressurized fuel vapor to flow from the tank passageway into the canister passageway through a FIRST partly opened first vent formed in the stationary perforated partition plate during the early stage of refueling the fuel tank.
Figure 6:
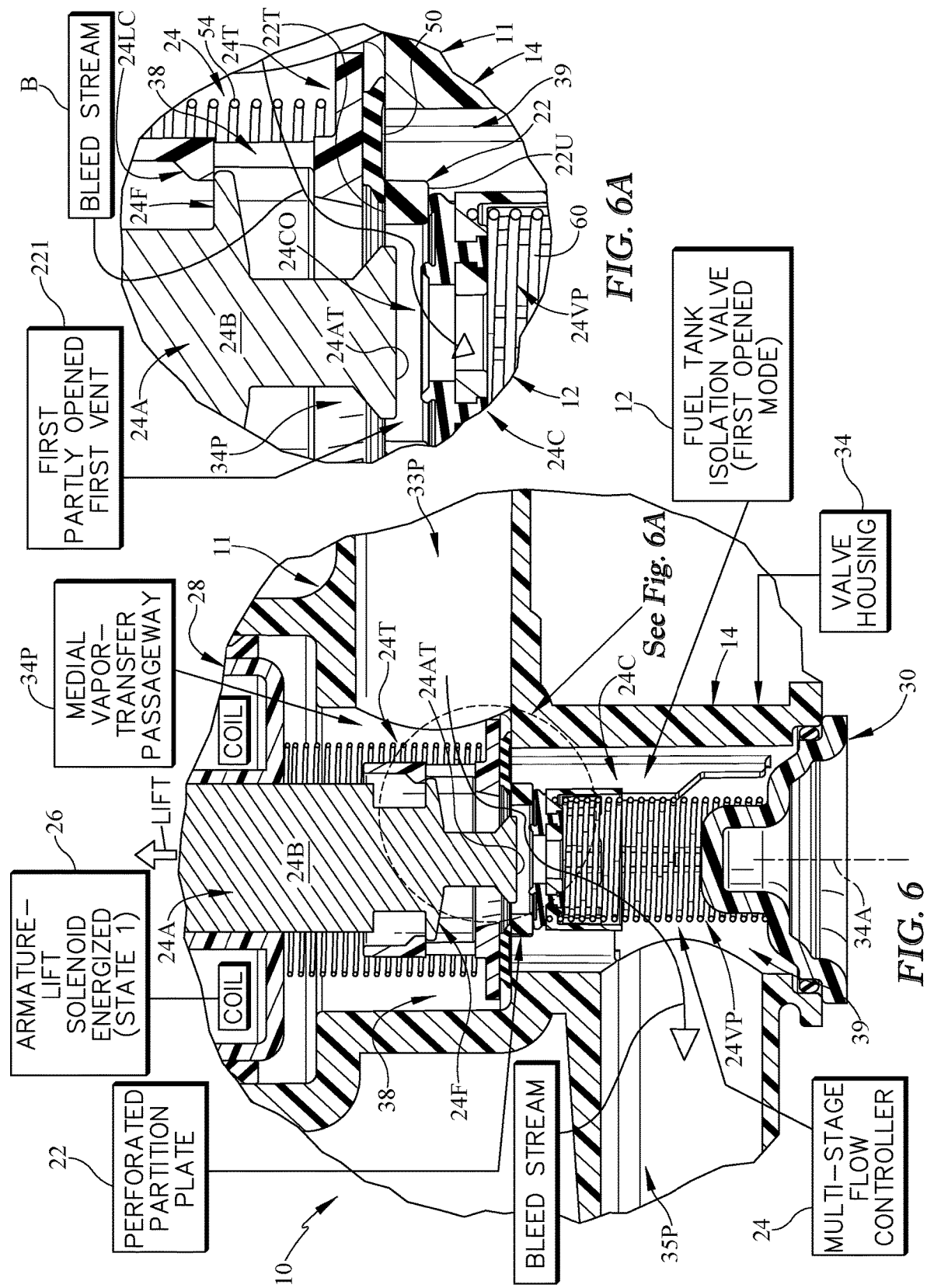
FIG. 6 is an enlarged view taken from the circled region of FIG. 5 showing a first partial opening of the first vent.

A FIRST OPENED mode of fuel tank isolation valve 12 is established during an early stage of fuel tank refueling as shown in FIGS. 5, 6, and 6A when solenoid 26 is energized to lift distal tip 24AT of movable armature 24A upwardly to disengage canister-side vapor-flow regulator 24C so as to open vapor-flow orifice 24CO while tank-side vapor-flow regulator 24T remains engaged to topside 22T of perforated partition plate 22 and the canister-side vapor-flow regulator 24C remains engaged to underside 22U of perforated partition plate 22 so that a BLEED stream (B) of pressurized fuel vapor can flow from the tank passageway 33P through the medial vapor-transfer passageway 34P through the narrowly opened first vent 221 in its FIRST partly opened state as shown in FIG. 6A. This allows displaced fuel vapor to begin to flow from fuel tank 16 to fuel-vapor recovery canister 18 through medial vapor-transfer passageway 34P.

A SECOND OPENED mode of fuel tank isolation valve 12 is established during a later stage of fuel tank refueling as suggested in FIGS. 7 and 8 when solenoid 26 is further energized to lift tank-side vapor-flow regulator 24T upwardly away from perforated partition plate 22 to open second vent 222 and to move distal tip 24AT of movable armature 24A out of first vent 221 to a position above and away from topside 22T of perforated partition plate 22 to further open first vent 221 so as to change first vent 221 to its SECOND partly opened state shown in FIG. 8 so that a relatively greater DISCHARGE stream (D) of pressurized fuel vapor can flow from the tank passageway 33P through the medial vapor-transfer passageway 34P through the opened second vent 222 and the more widely opened first vent 221. Movable armature 24A includes an elongated body 24B that extends between top end and distal tip 24AT and a radially outwardly extending lift flange 24F cantilevered to elongated body 24B as suggested in FIGS. 4 and 6.

Tank-side vapor-flow regulator 24T is formed to include a radially inwardly extending lift catch 24LC as also shown in FIGS. 4 and 6. When solenoid 26 is energized, movable armature 24A is moved upwardly along central vertical axis 34A to compress armature-biasing spring 40 between top valve-housing closure 28 and top end of movable armature 24A owing to application of a lifting force applied by the upwardly moving lift flange 24F of movable armature 24A to the underside of lift catch 24LC of tank-side vapor-flow regulator 24T as suggested in FIGS. 7 and 8. This lift force moves tank-side vapor-flow regulator 24T upwardly to open second vent 222 and to move distal tip 24AT of movable armature 24A further away from perforated partition plate 22 to establish the SECOND partly opened state of first vent 221 as shown in FIG. 8.

In the normally CLOSED mode, no part of moveable armature 24A touches or engages regulator 24T to close orbital vent apertures 221, 222 of plate 22. Rather spring 54 biases regulator 24T into engagement with topside 22T of plate 22. Regulator 24T has openings so that lift flange 24F of moveable armature 24A does not engage any part of tank-side vapor-flow regulator 24T. It is only when valve 12 is in second opened mode does moveable armature 24A engage radially inwardly extending lift catch 24LC of regulator 24T to compress spring 54 and open orbital vent apertures 221, 222.

Figure 9:
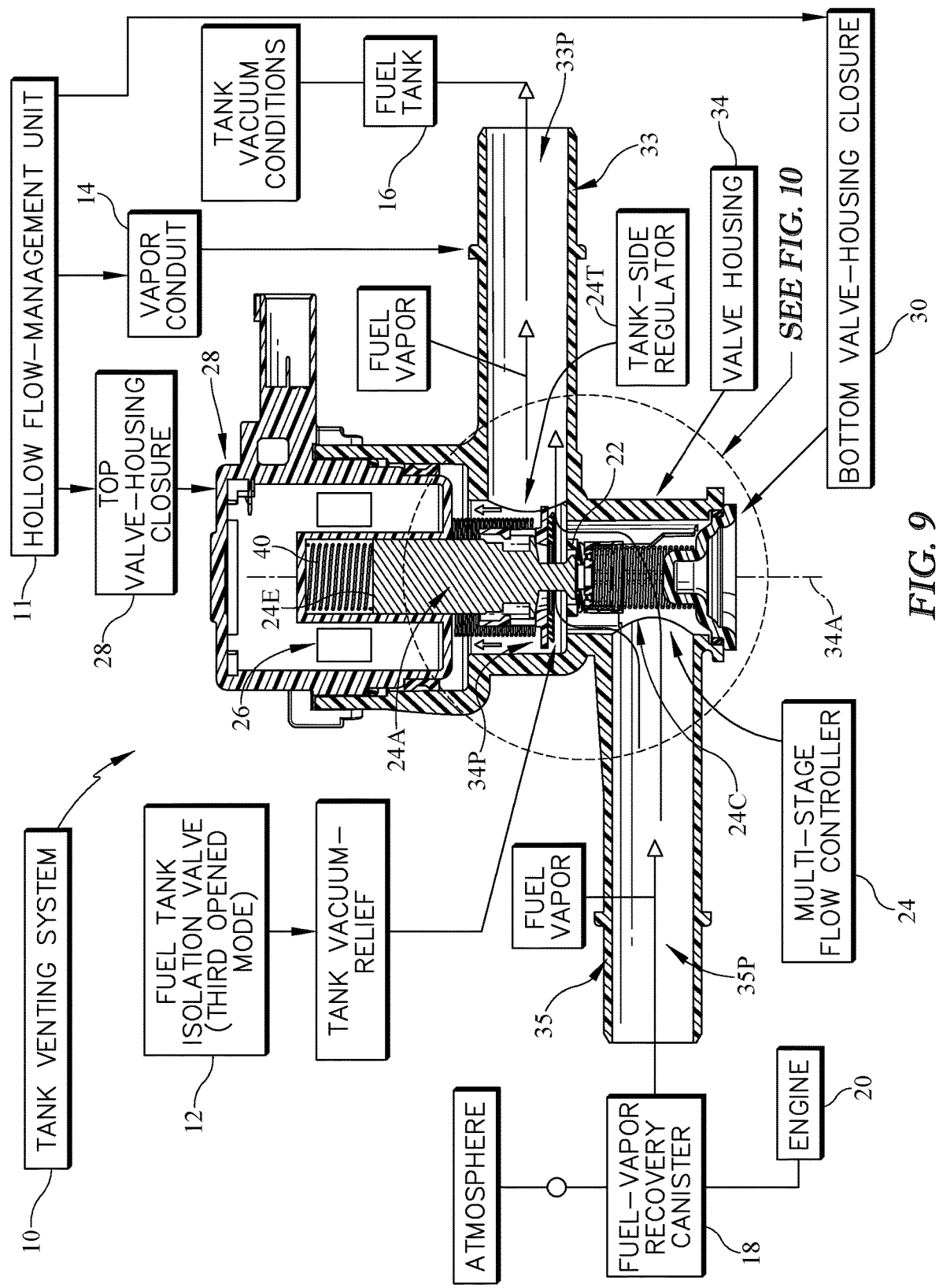
FIG. 9 is a sectional view similar to FIGS. 3, 5, and 7 showing the fuel tank isolation valve in a THIRD OPENED mode during development of unwanted vacuum conditions in the fuel tank to draw atmospheric air through the fuel-vapor recovery canister to generate flow of fuel vapor in the canister pipe that passes through an opened second vent located in the medial vapor-transfer passageway to flow through the tank pipe into the fuel tank to dissipate unwanted vacuum in the fuel tank.
Figure 10:
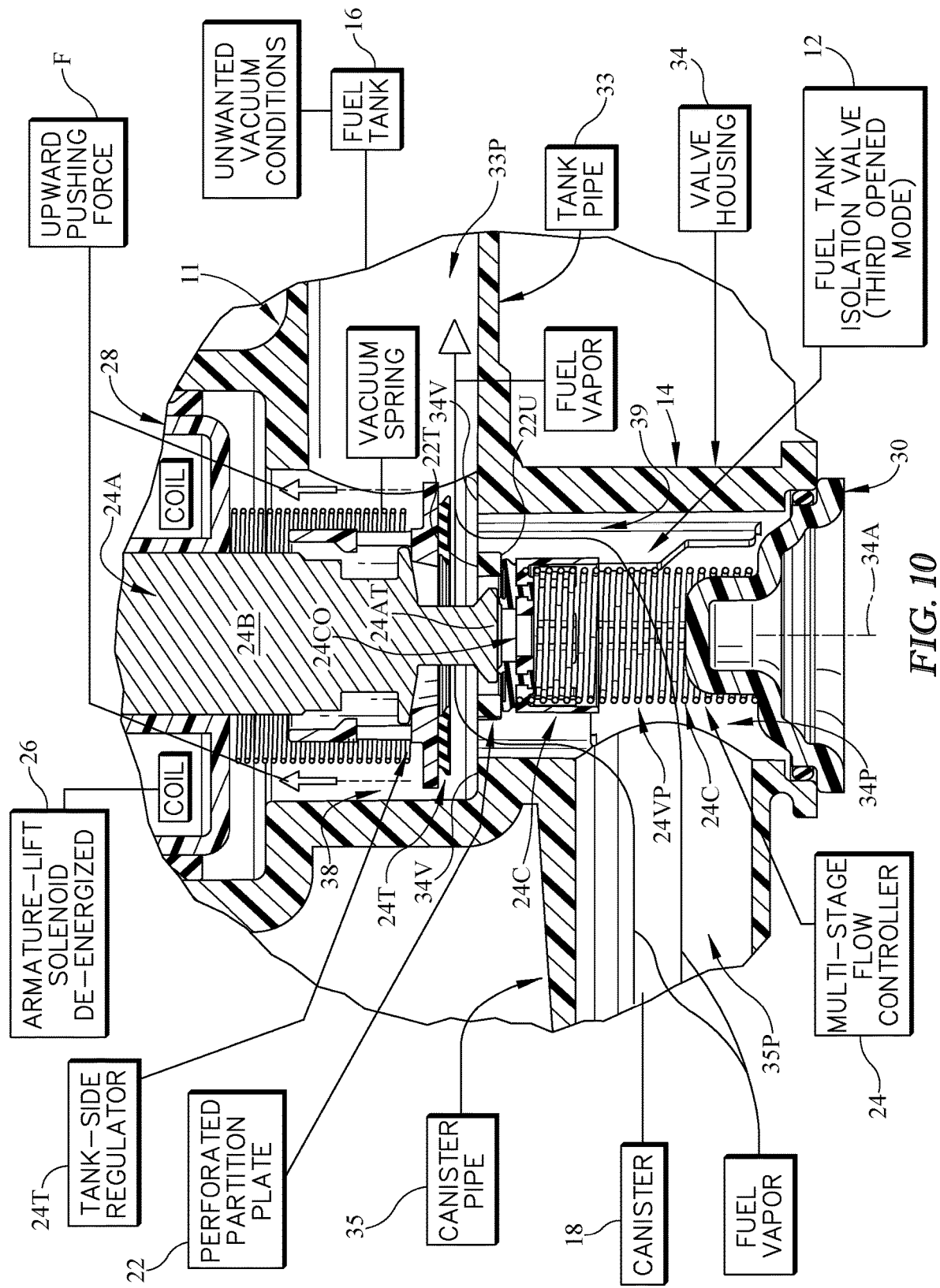
FIG. 10 is an enlarged view taken from the circled region of FIG. 9 when the fuel tank isolation valve is in the THIRD OPENED mode showing that the second vent is opened while the first vent is closed.

A THIRD OPENED mode of fuel tank isolation valve 12 is established as shown in FIGS. 9 and 10 to conduct fuel vapor from fuel-vapor recovery canister 18 through the medial vapor-transfer passageway 34P into fuel tank 16 to alleviate any unwanted vacuum conditions that develop in fuel tank 16. In this THIRD OPENED mode, relatively high fuel vapor pressure extant in the canister-side chamber 39 acts on tank-side vapor-flow regulator 24T through second vent 222 to apply an upward pushing force to the underside of tank-side vapor-flow regulator 24T so as to move tank-side vapor-flow regulator 24T upwardly in the tank-side chamber 38 to disengage topside 22T of perforated partition plate 22 to open second vent 222 while solenoid 26 is de-energized to allow the armature-moving spring 40 associated with movable armature 24A to move the movable armature 24A downwardly to extend distal tip 24AT into first vent 221 to close the vapor-restriction orifice 24CO formed in canister-side vapor-flow regulator 24C while that canister-side vapor-flow regulator 24C engages underside 22U of perforated partition plate 22.

Figure 11:
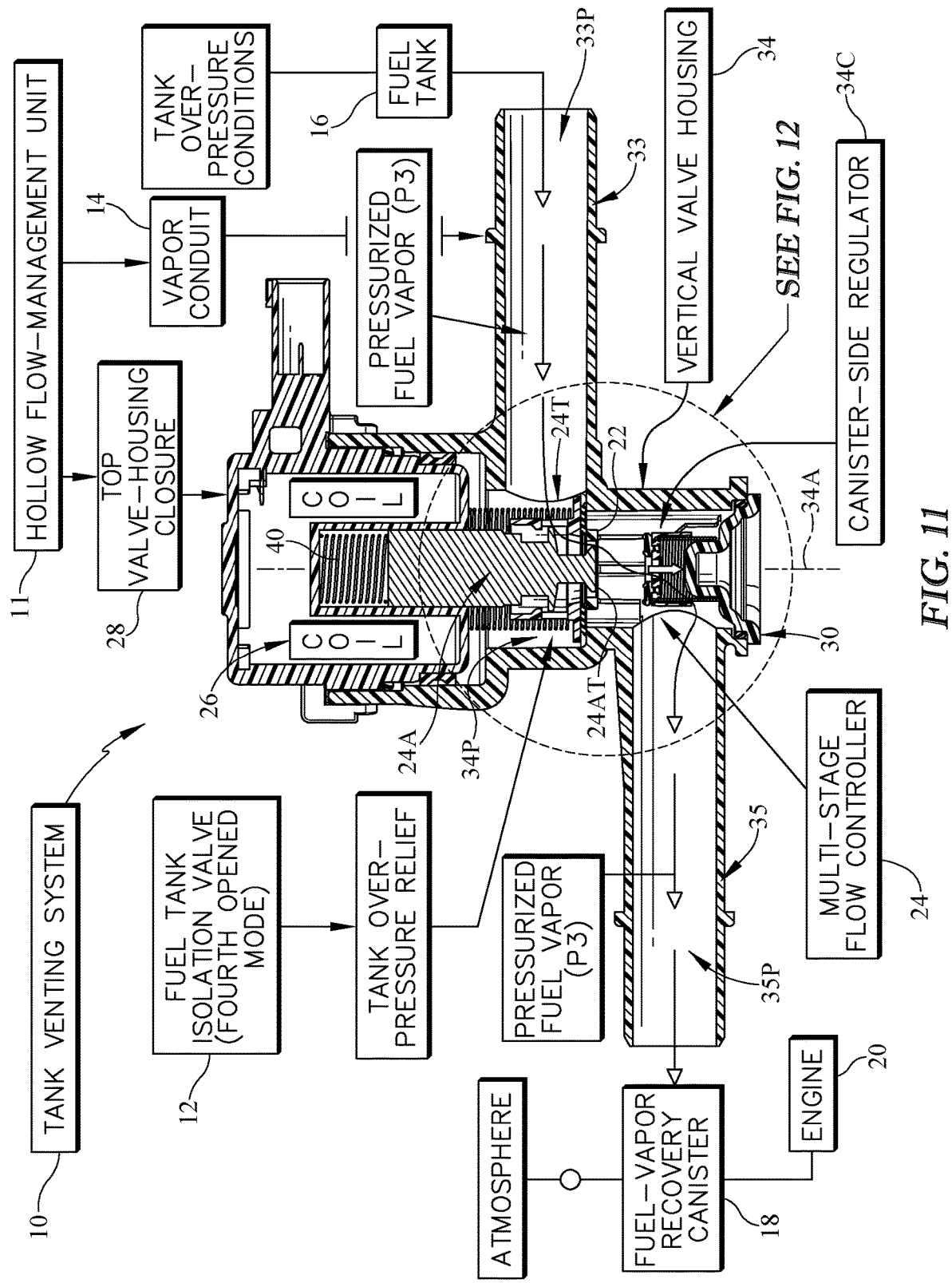
FIG. 11 is a sectional view similar to FIGS. 3, 5, 7, and 9 showing the fuel tank isolation valve in a FOURTH OPENED mode during development of unwanted over-pressure conditions in the fuel tank to cause pressurized fuel vapor to flow from the tank pipe into the canister pipe through a THIRD partly opened first vent formed in the stationary perforated partition plate.
Figure 12:
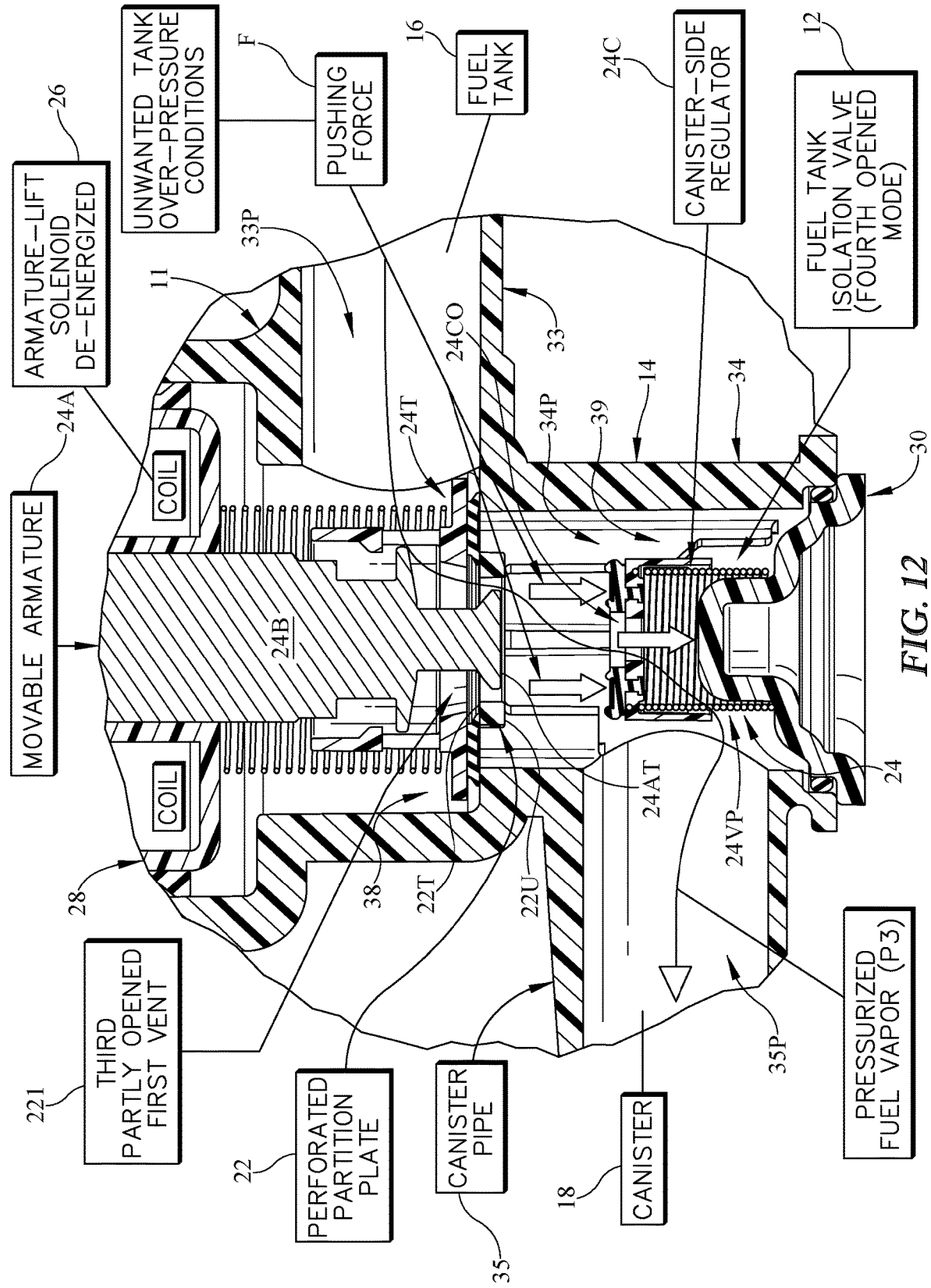
FIG. 12 is an enlarged view taken from the circled region of FIG. 11 when the fuel tank isolation valve is in the FOURTH OPENED mode.

A FOURTH OPENED mode of fuel tank isolation valve 12 is established as shown in FIGS. 11 and 12 to conduct pressurized fuel vapor from fuel tank 16 to fuel-vapor recovery canister 24C through the medial vapor-transfer passageway 34P to alleviate over-pressure conditions that develop in fuel tank 16. In this FOURTH OPENED mode, relatively high fuel vapor pressure extant in the tank-side chamber 39 acts on canister-side vapor-flow regulator 24C through the partly opened first vent 221 to move canister-side vapor-flow regulator 24C downwardly away from underside 22U of perforated partition plate 22 to enlarge the opening in first vent 221 to assume a THIRD partly opened state as shown in FIG. 12 while tank-side vapor-flow regulator 24T remains engaged to topside 22T of perforated partition plate 22.

As mentioned above, fuel tank isolation valve 12 may be important to regulate the pressure of fuel vapor in the system of hybrid vehicles. Fuel tank isolation valve 12 is normally closed to block the flow of fuel vapor from tank 16 to canister 18 as shown in FIG. 3. Fuel tank isolation valve 12 has four different open modes (the first opened mode as shown in FIG. 5, the second opened mode as shown in FIG. 7, the third opened mode as shown in FIG. 9, and the fourth opened mode as shown in FIG. 11) to regulate the flow of fuel vapor between fuel tank 16 and canister 18 based on different conditions of the system.

In the case of over-pressure conditions, valve 12 changes to the fourth mode to allow a release a large amount of pressure from fuel tank 16. Conversely, if there is vacuum conditions in fuel tank 16, fuel tank isolation valve 12 may change to third opened mode to alleviate unwanted vacuum conditions. Once the vehicle switches to using engine 20, fuel tank isolation valve 12 may change to one of first opened mode, second opened mode, and fourth opened mode to allow the fuel vapor to flow from fuel tank 16 through canister 18 and to the engine to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 12 changes from closed mode to first opened mode to vent some displaced fuel vapor from fuel tank 16. After refueling begins and fuel is being discharged at a constant rate into fuel tank 16, fuel tank isolation valve 12 changes to second opened mode to vent more displaced fuel vapor.

A sectional perspective view of tank venting system 10 is provided in FIG. 1 to show that vapor conduit 14 of hollow flow-management unit 11 is arranged to interconnect fuel tank 16 and fuel-vapor recovery canister 18 in fluid communication and that fuel tank isolation valve 12 is located inside a medial vapor-transfer passageway 34P formed in vapor conduit 14 of the hollow flow-management unit 11. Fuel tank isolation valve 12 is operable in accordance with the present disclosure to manage vapor flow between fuel tank 16 and fuel-vapor recovery canister 18 through vapor conduit 14 of the hollow flow-management unit 11 during four OPENED modes of operation.

Vapor conduit 14 of the hollow flow-management unit 11 includes a canister pipe 35 coupled at an outer end to fuel-vapor recovery canister 18 via canister conduit 15, a tank pipe 33 coupled at an outer end to fuel tank 16 via tank conduit 13, a vertical valve housing 34 arranged to lie in fluid communication with each of the inner ends of canister and tank pipes 35, 33 and sized to contain fuel tank isolation valve 12 therein as suggested in FIG. 1. Top valve-housing closure 28 coupled to a top end of valve housing 34 of vapor conduit 14 while bottom valve-housing closure 30 is coupled to an opposite bottom end of valve housing 34.

Figure 2B:
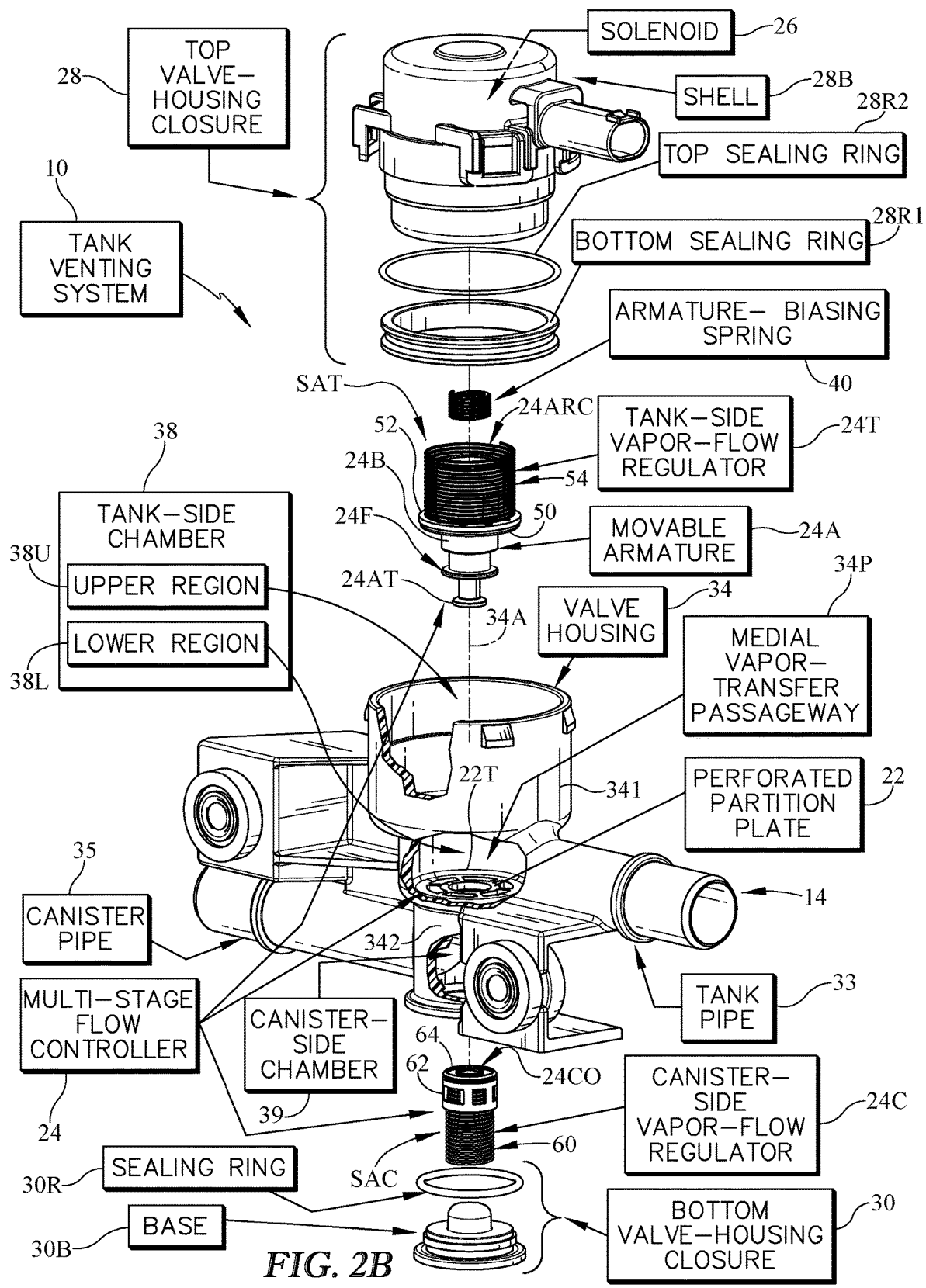
FIG. 2B is another perspective assembly view showing the canister pipe, valve housing, and tank pipe of the vapor conduit of the hollow flow-management unit along with components of the fuel tank isolation valve shown in FIG. 2A to illustrate division of the medial vapor-transfer passageway formed in the valve housing by the stationary perforated partition plate to form a tank-side chamber above the perforated partition plate and a canister-side chamber below the perforated partition plate.

Fuel tank isolation valve 12 comprises a perforated partition plate 22 that is arranged to divide the interior region of the vertical valve housing 34 of vapor conduit 14 into a canister-side chamber 39 that communicates with canister pipe 35 and an overlying tank-side chamber 38 that communicates with tank pipe 33 as suggested in FIG. 2B. Perforated partition plate 22 is formed to include a central vent aperture 221 to establish first vent 221 and six orbital vent apertures 222a-f establishing second vent 222 and surrounding central vent aperture 221 as shown in FIGS. 1A and 2B, an armature-moving solenoid 26 mounted in an upper region 38U of the tank-side chamber 38 as shown in FIG. 3, and a multi-stage flow controller 24. Multi-stage flow controller 24 includes a movable armature 24A that is arranged normally in a CLOSED mode of the fuel tank isolation valve 12 as shown in FIGS. 1, 3, and 4 to block flow of fuel vapor through the central and orbital vent apertures 221, 222 formed in perforated partition plate 22 included in fuel tank isolation valve 12 so that fuel-vapor recovery canister 18 is normally isolated from fuel tank 16 until either (1) a tank refueling activity begins as suggested in FIG. 4; (2) tank vacuum exceeds a predetermined vacuum level as suggested in FIG. 9; or (3) tank pressure exceeds a predetermined pressure level as suggested in FIG. 11.

Perforated partition plate 22 is shown in FIG. 1A and arranged to divide medial vapor-transfer passageway 34P into an upper tank-side chamber 38 and a lower canister-side chamber 39 as suggested in FIG. 3. Perforated partition plate 22 is formed to include a round central vent aperture 221 centered on central vertical axis 34A and six arc-shaped orbital vent apertures 222a-f arranged to surround the round central vent aperture 221 and lie in radially spaced relation from central vertical axis 34A and circumferentially spaced-apart relation to one another. Perforated partition plate 22 is mounted in a stationary position in the interior region of the vertical valve housing 34 of the vapor conduit 14.

As suggested in FIG. 2A, fuel tank isolation valve 12 comprises a perforated partition plate 22, an armature-moving solenoid 26, and a multi-stage flow controller 24 including a tank-side vapor-flow regulator 24T comprising a seal ring 50, a top hat-shaped spring cap 52, and a large-diameter compression (vacuum) spring 54; an armature-biasing spring 40; a movable armature 24A; and a canister-side vapor-flow regulator 24C comprising a narrow-diameter compression (pressure) spring 60, a spring cap 62, and an annular seal 64.

An exploded perspective assembly view is provided in FIG. 2B to show two sub-assemblies SAT, SAC included in fuel tank isolation valve 12 and the empty vapor conduit 14 of the hollow flow-management unit 11. A portion of a tank-side chamber shell 341 of valve housing 34 is broken away to reveal that perforated partition plate 22 included in fuel tank isolation valve 12 is formed to include a central vent aperture 221 surrounded by a series of orbital vent apertures 222a-f. Installation of a top vent apparatus sub-assembly SAT included in the fuel tank isolation valve 12 in a downward direction into an upwardly opening tank-side chamber 38 formed in a tank-side shell 341 included in the vertical valve housing 34 of vapor conduit 14 of the hollow flow-management unit 11 is suggested in FIG. 2B. Installation of a bottom vent apparatus sub-assembly SAC included in fuel tank isolation valve 12 in an upward direction into a downwardly opening canister-side chamber 39 formed in a canister-side chamber shell 342 included in the vertical valve housing 34 of the vapor conduit 14 of hollow flow-management unit 11 is also suggested in FIG. 2B.

Figure 2C:
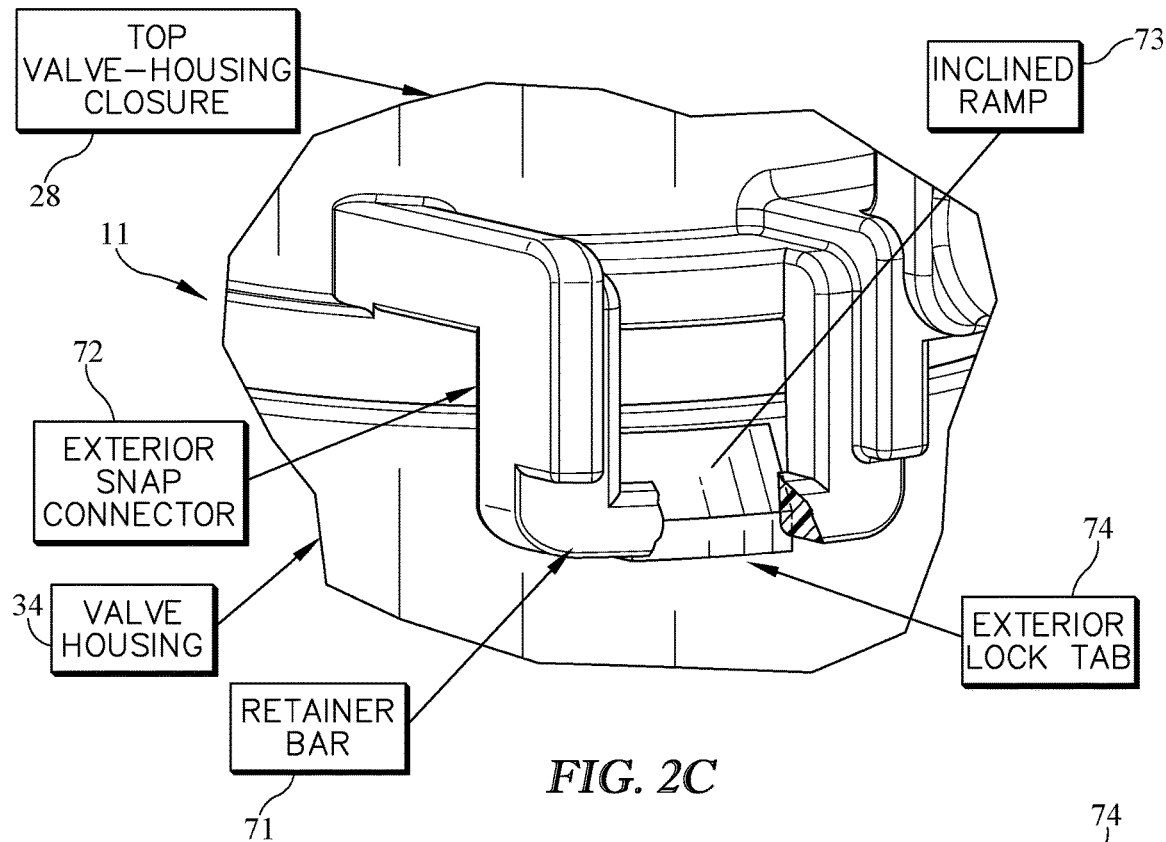
FIGS. 2C and 2D show an illustrative snap-coupling process for coupling the top valve-housing closure to a top end of the valve housing to cover a top opening into the medial vapor-transfer passageway formed in the valve housing.
Figure 2D:
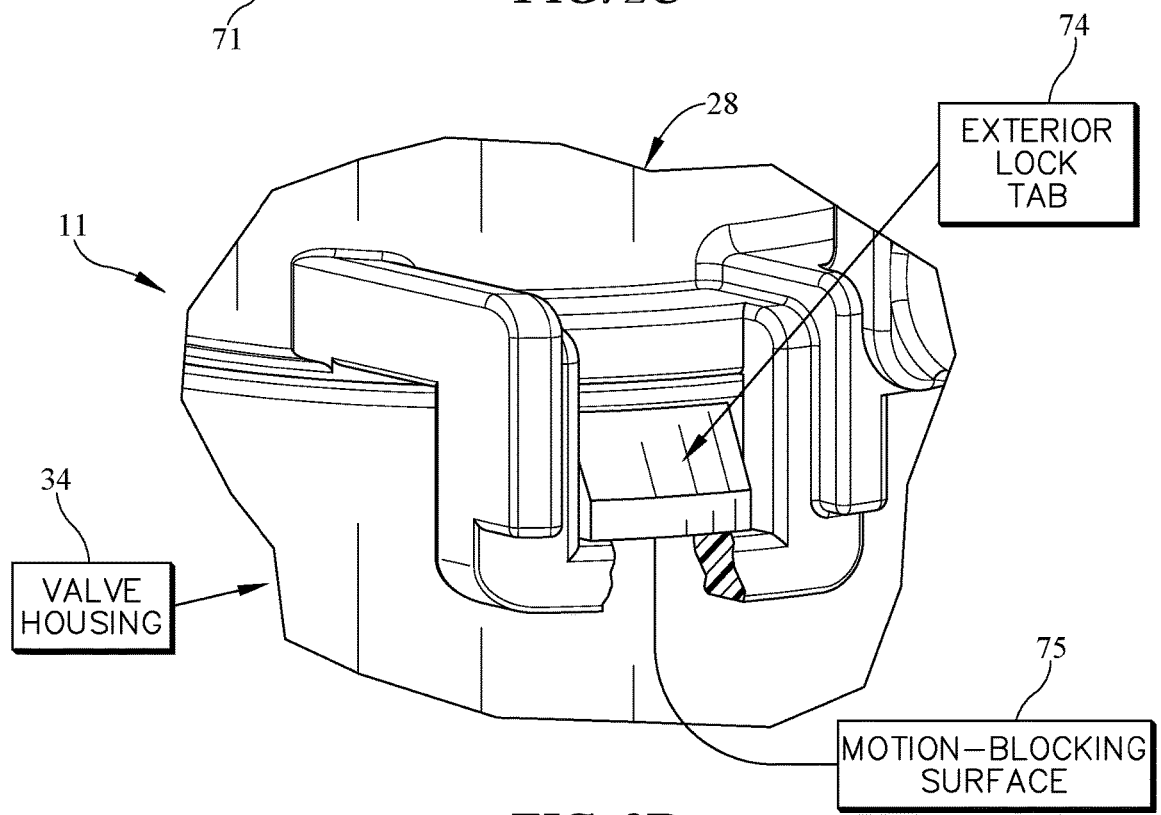

A snap-connection assembly process is illustrated in FIGS. 2C and 2D for coupling the top valve-housing closure 28 of the hollow flow-management unit 11 to the tank-side shell 341 of valve housing 34 of the hollow flow-management unit 11 in accordance with the present disclosure. A retainer bar 71 included in an exterior snap connector 72 included on a shell 28B of the top valve-housing closure 28 first rides on an inclined ramp 73 of an exterior lock tab 74 that is included in valve housing 34 of the hollow flow-management unit 11 and coupled to an exterior surface of tank-side shell 341 during downward movement of top valve-housing closure 28 relative to tank-side shell 341 as shown in FIG. 2C. Retainer bar 71 of the exterior snap connector 72 of top valve-housing closure 28 has been moved to disengage inclined ramp 73 and to find a home underneath exterior lock tab 74 in engagement with a downwardly facing motion-blocking surface 75 of exterior lock tab that is located below inclined ramp 73 of exterior lock tab 74 as shown in FIG. 2D. In the illustrative embodiment, a bottom seal ring 28R1 and a top seal ring 28R2 seal between the top valve-housing closure 28 and the tank-side shell 341 of valve housing 34.

The bottom valve-housing closure 30 includes a base 30B and a seal ring 30R that engaged the canister-side chamber shell 342 of the valve housing 34 to close off the canister-side chamber 39. The spring 60 of the canister-side vapor-flow regulator 24C engages with the base 30B of the bottom valve-housing closure 30 to bias the spring cap 62 with the O-ring seal 64 into engagement with the underside 22U of perforated partition plate 22.

As suggested in FIG. 3, fuel tank isolation valve 12 is in its normally CLOSED mode to block flow of fuel vapor through vapor conduit 14 between fuel tank 16 and fuel-vapor recovery canister 18. Top and bottom vent apparatus sub-assemblies SAT, SAC included in fuel tank isolation valve 12 and shown in FIG. 2B have been installed in the vertical value housing 34 of vapor conduit 14 of the hollow flow-management unit 11 to cause the top and bottom vent apparatus subassemblies SAT, SAC to lie in alignment with one another along a single vertical axis 34A that extends through the center of perforated partition plate 22 to cooperate with perforated partition plate 22 to establish a fuel tank isolation valve 12 in accordance with the present disclosure that functions normally to block all flow of fuel vapor between tank and canister pipes 33, 35 through the interior region of the vertical valve housing 34 of vapor conduit 14 of the hollow flow-management unit 11.

As suggested in FIG. 4, the top vent apparatus sub-assembly SAT included in fuel tank isolation valve 12 and shown FIG. 2 has been installed in the vertical valve housing 34 of vapor conduit 14 to cause a downwardly extending tip 24AT of movable armature 24A to extend along the single vertical axis 34A into the first vent 221 established by central vent aperture 221 and formed in perforated partition plate 22 (see FIG. 4B) and to cause seal ring 50 of tank-side vapor-flow regulator 24T to engage an annular outer perimeter region of topside 22T of perforated partition plate 22 to block fuel vapor from passing through the second vent 222 established by six orbital vent apertures 222a-f (see FIG. 4B) surrounding the central vent aperture 222 and showing that second vent 222 established by an inner rim of O-ring seal 64 of canister-side vapor-flow regulator 24C engages a downwardly facing surface on distal tip 24AT of movable armature 24A and an outer rim of O-ring seal 64 of canister-side vapor-flow regulator 24C engages a downwardly facing surface on the annular inner perimeter region of underside 22U of perforated partition plate 22 that surrounds the central vent aperture 221 to block fuel vapor from passing through the central vent aperture 221 formed in perforated partition plate 22. The round central vent aperture 221 and the six surrounding circumferentially spaced-apart arcuate orbital vent apertures 222a-f formed in perforated partition plate 22 of fuel tank isolation valve 12 are shown for example in FIG. 4B.

A FIRST STAGE of a refueling depressurization of fuel tank 16 takes place when fuel tank isolation valve 12 is in the FIRST OPENED mode as suggested in FIGS. 5, 6, and 6A during use of a fuel-dispensing pump nozzle by an operator (not shown) to refuel fuel tank 16 is shown in FIG. 5. Multi-stage flow controller 24 is shown in a solenoid-activated FIRST OPENED configuration to allow a small BLEED stream (B) of pressurized fuel vapor to flow from a tank passageway 33P formed in tank pipe 33 through the central vent aperture 221 formed in perforated partition plate 22, and a small-diameter central vapor-flow orifice 24CO formed in each of the O-ring seal 64 and the spring cap 62 of canister-side vapor-flow regulator 24C in response to activation of solenoid 26 to produce a magnetic field in the movable armature 24A associated with tank-side vapor-flow regulator 24T to move the armature 24A upwardly from a CLOSED position engaging the O-ring seal 64 of canister-side vapor-flow regulator 24C as shown in FIG. 4 to an OPENED position disengaging the O-ring seal 64 of canister-side vapor-flow regulator 24C as shown in FIG. 6.

An enlarged view taken from the circular region of FIG. 5 is provided in FIG. 6 to show a small BLEED flow stream (B) of pressurized fuel vapor that passes from a tank passageway 33P formed in tank pipe 33 through spaces formed in the large-diameter compression (vacuum) spring 54 of tank-side vapor-flow regulator 24T and then through the central value aperture 221 formed in perforated partition plate 22. And then, owing to activation of solenoid 26 to cause upward movement of movable armature 24A relative to perforated partition plate 22 to disengage the annular seal 64 of the canister-side vapor-flow regulator 24C, the small BLEED flow stream (B) is able to pass through now-opened vent vapor-flow orifices 24CO formed in each of the annular seal 64 and the companion spring cap 62 of canister-side vapor-flow regulator 24C and then pass through spaces formed in the small-diameter compression (pressure) spring 60 of canister-side vapor-flow regulator 24C into the canister passageway 35P formed in canister pipe 35.

Figure 7:
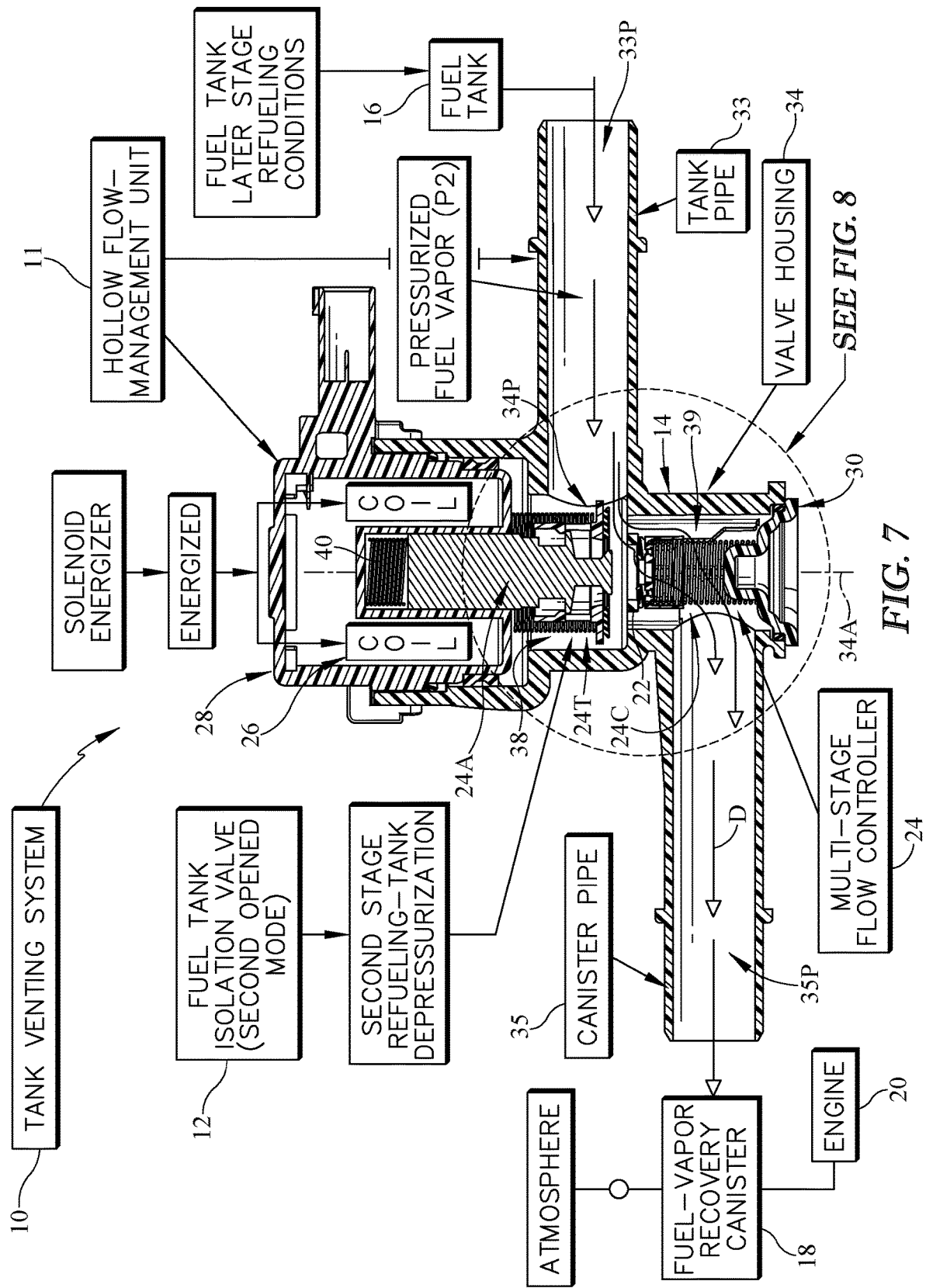
FIG. 7 is a view similar to FIGS. 3 and 5 showing the fuel tank isolation valve in a SECOND OPENED mode during a later stage of fuel tank refueling to allow a relatively larger DISCHARGE stream of pressurized fuel vapor to flow from the tank passageway into the canister passageway through a SECOND partly opened first vent and an opened second vent owing to upward movement of the tank-side vapor-flow regulator to disengage the topside of the stationary perforated partition plate during the later stage of refueling the fuel tank.
Figure 8:
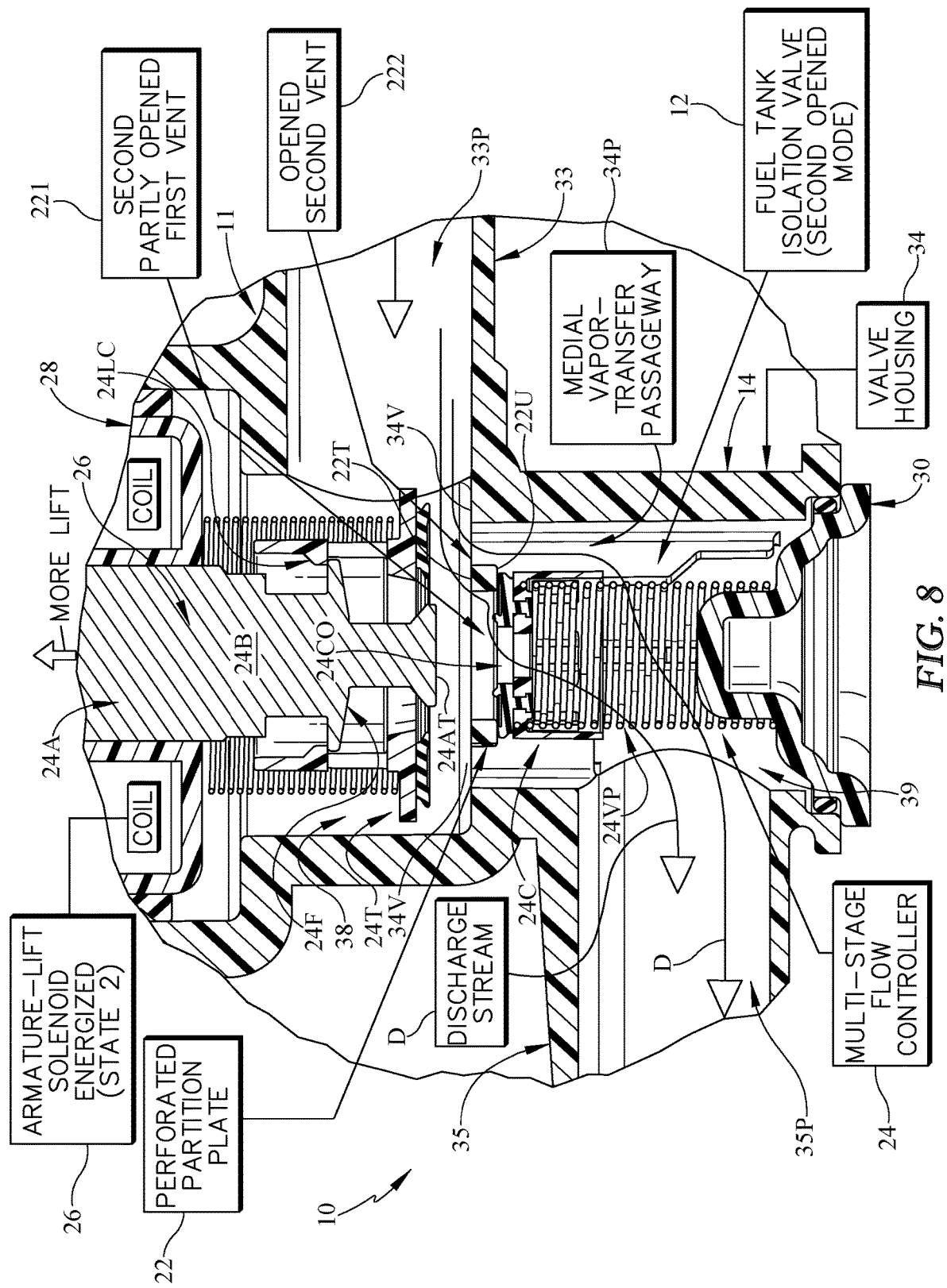
FIG. 8 is an enlarged view taken from the circled region of FIG. 7 when the fuel tank isolation valve is in the SECOND OPENED mode showing flow of the DISCHARGE stream of pressurized fuel vapor through the SECOND partly opened first vent and then into the canister passageway.

A SECOND STAGE of a refueling depressurization of fuel tank 16 takes place when fuel tank isolation valve 12 is in the SECOND OPENED mode as suggested in FIGS. 7 and 8. Multi-stage flow controller 24 is shown in a pressure-activated SECOND OPENED configuration to vent pressurized fuel vapor from the tank passageway 33P into the canister passageway 35P after the pressure of the pressurized fuel vapor extant in the tank passageway 33P has risen from a first pressure (P1) suggested in FIG. 5 to a higher second pressure (P2) suggested in FIG. 7 to urge top hat-shaped spring cap 52 and the associated O-ring seal 50 upwardly away from perforated partition plate 22 to compress the large-diameter compression (vacuum) spring 54 and open the normally closed six orbital vent apertures 222a-f formed in perforated partition plate 22 while the central vent aperture 221 found in perforated partition plate 21 remains open so that a greater volume of pressurized fuel vapor can be discharged from fuel tank 16 to fuel-vapor recovery canister 24C via medial vapor-transfer passageway 34P of vapor conduit 14 of the hollow flow-management unit 11.

An enlarged view taken from the circled region of FIG. 7 is provided in FIG. 8 to show the flow of pressurized fuel vapor that passes from the tank passageway 33P through the central and orbital vent apertures 221, 222 formed in perforated partition plate 22 into the canister passageway 35P during refueling of fuel tank 16. Solenoid 26 is energized to move movable armature 24A upwardly. This activity causes lift flange 24F of movable armature 24A to engage an underside of lift catch 24LC of top hat-shaped spring cap 52 to apply a lifting force to top hat-shaped spring cap 52 so as to move seal ring 50 included in tank-side vapor-flow regulator 24T upwardly to cause seal ring 50 to disengage the underlying perforated partition plate 22 and open the six orbital vent apertures 222a-f formed in perforated partition plate 22 while solenoid 26 remains energized.

Development of unwanted vacuum conditions in fuel tank 16 at a time when no tank refueling activity is taking place is shown in FIG. 9. Multi-stage flow controller 24 is shown in a vacuum-activated THIRD OPENED configuration after vacuum (e.g. negative pressure) conditions have developed in fuel tank 16 in which tank-side vapor-flow regulator 24T has moved upwardly to disengage the underlying perforated partition plate 22 to open the six orbital vent apertures 222a-f found in perforated partition plate 22 so as to allow fuel vapor comprising atmosphere air entrained with fuel droplets de-adsorbed from fuel-vapor recovery canister 18 to flow into and through the canister passageway 35P formed in canister pipe 35 and then through the six orbital vent apertures 222a-f and through the tank passageway 33P formed in tank pipe 33 and into fuel tank 16 via tank conduit 13 to relieve the unwanted vacuum conditions in fuel tank 16.

An enlarged view taken from the circled region of FIG. 9 is provided in FIG. 11 to show that the stream of fuel vapor flowing from the canister passageway 35P through the six orbital vent apertures 222a-f formed in perforated partition plate 22 after solenoid 26 has been energized further, in effect, to apply an upward lifting force to top hat-shaped spring cap 52 and the companion seal ring 50 of tank-side vapor-flow regulator 24T. This lifting force moves those components in an upward direction relative to the hollow flow-management unit 11 to compress the large-diameter compression (vacuum) spring 54 to open the six orbital vent apertures 222a-f while the central vent aperture 221 remains closed to allow such fuel vapor to flow through the tank passageway 33P formed in tank pipe 33 into fuel tank 16 to relieve unwanted vacuum conditions in fuel tank 16.

During development of unwanted over-pressure conditions in the fuel tank 16 at a time when no tank refueling activity is taking place is shown in FIG. 11. Multi-stage flow controller 24 is shown in a pressure-activated FOURTH OPENED configuration after the pressure of fuel vapor extant in fuel tank 16 has risen above a predetermined maximum pressure level in which canister-side vapor-flow regulator 24C has moved downwardly to disengage the overlying perforated partition plate 22 to open a portion of the central vent aperture 221 formed in perforated partition plate 22 that extends around a cylindrical body 24B included in movable armature 24A to allow pressurized fuel vapor (P3) to flow from fuel tank 16 to fuel-vapor recovery canister 18 via tank and canister pipes 33, 35 and the vertical valve housing 34 of vapor conduit 14 included in the hollow floor-management unit 11.

An enlarged view taken from the circled region of FIG. 11 is provided in FIG. 12 to show that the stream of pressurized fuel vapor (P3) flowing from the tank passageway 33P through the central vent aperture 221 formed in perforated partition plate 22 to establish first vent 221 functions to apply a downward pushing force (F) to the topsides of the spring cap 52 and the companion annular seal 50 of canister-side vapor-flow regulator. This downward pushing force (F) pushes those components in a downward direction relative to the hollow flow-management unit 11 to compress the small-diameter compression (pressure) spring 60 to open most of the central valve aperture 221 while the six orbital vent apertures 221 a-f establishing second vent 222 remain closed to allow such pressurized fuel vapor (P3) to flow through the canister passageway 35P formed in canister pipe 35 into fuel-vapor recovery canister 18 to relieve unwanted over-pressure conditions in fuel tank 16.

A tank venting system 10 in accordance with the present disclosure comprises a hollow flow-management unit 11 and a fuel tank isolation valve 12 as shown in FIG. 1. Fuel tank isolation valve 12 has a normally CLOSED mode and four OPENED modes in accordance with the present disclosure.

Hollow flow-management unit 11 includes a vapor conduit 14 formed to include a canister passageway 35P adapted to be coupled in fluid communication to fuel-vapor recovery canister 18 and a tank passageway 33P adapted to be coupled in fluid communication to fuel tank 16 as shown in FIG. 1. Vapor conduit 14 is also formed to include a medial vapor-transfer passageway 34P arranged to interconnect the canister and tank passageways 35P, 33P in fluid communication to transfer fuel vapor flowing from fuel tank 16 associated with the tank passageway 33P through the tank and canister passageways 35P, 33P to fuel-vapor recovery canister 18 associated with the canister passageway 35P and to transfer fuel vapor flowing from fuel-vapor recovery canister 18 to fuel tank 16 through the canister and tank passageways 35P, 33P.

Fuel tank isolation valve 12 includes a perforated partition plate 22 as shown in FIGS. 1 and 1A. Perforated partition plate 22 is shown in FIG. 4 to be mounted in a stationary position in the medial vapor-transfer passageway 34P formed in vapor conduit 14 to partition the medial vapor-transfer passageway 34P so as to establish a tank-side chamber 38 communicating with the tank passageway 33P and a canister-side chamber 39 communicating with the canister passageway 35P to cause a first-side surface 22T of stationary perforated partition plate 22 to intercept fuel vapor flowing in the medial vapor-transfer passageway 34P from the tank passageway 33P to the canister passageway 35P and to cause an opposite second-side surface 22U of stationary perforated partition plate 22 to intercept fuel vapor flowing in the medial vapor-transfer passageway 34P from the canister passageway to the tank passageway 33P. Stationary perforated partition plate 22 is formed as shown in FIGS. 1A, 4, and 4B to include a first vent 221 opening through first-side surface 22T into the tank-side chamber 38 of the medial vapor-transfer passageway 34P and also opening through second-side surface 22U into the canister-side chamber 39 of the medial vapor-transfer passageway 34P. Stationary perforated partition plate 22 is also formed to include a second vent 221 separated from the first vent 221 to open through first-side surface 22T into the tank-side chamber 38 and also to open through second-side surface 22U into the canister-side chamber 39.

Fuel tank isolation valve 12 further includes a multi-stage flow controller 24 configured in accordance with the present disclosure as suggested in FIG. 2A to provide for normally closing the first and second vents 221, 222 formed in stationary perforated partition plate 22 as shown in FIGS. 1, 3, and 4. The first and second vents 221, 222 are closed normally to block flow of fuel vapor through each of first and second vents 221, 222 to establish a normally CLOSED mode of fuel tank isolation valve 12 so that fuel vapor cannot flow through vapor conduit 14 between fuel tank 16 and fuel-vapor recovery canister 18 so as to isolate fuel tank 16 normally from fluid communication with fuel vapor recovery canister 18.

Multi-stage flow controller 24 is also configured as shown in FIG. 5 in accordance with the present disclosure to provide for temporarily restricting flow of pressurized fuel vapor extant in the tank-side chamber 38 through the first vent 221 formed in stationary perforated partition plate 22 into the canister-side chamber 39 to initiate partial opening of first vent 221 to realize a first restriction to flow of pressurized fuel vapor through first vent 221 characterized by a FIRST partly opened state of first vent 221 while second vent 222 remains closed so as to establish a FIRST OPENED mode of the fuel tank isolation valve 12 as shown in FIGS. 6 and 6A. This activity causes a BLEED stream (B) of pressurized fuel vapor to be discharged from the tank-side chamber 38 into the canister-side chamber 39 via FIRST partly opened first vent 221 formed in stationary perforated partition plate 22 during an early stage of refueling fuel tank 16 while the pressure of pressurized fuel vapor in the tank passageway 33P remains below a relatively higher second pressure (P2) so that pressurized fuel vapor is admitted into the canister-side chamber 39 to increase pressure extant in the canister-side chamber 39.

Multi-stage flow controller 24 is also configured as shown in FIG. 7 in accordance with the present disclosure to provide for temporarily opening the second vent 222 formed in the stationary perforated partition plate 22 while restricting flow of pressurized fuel vapor through first vent 221 characterized by a SECOND partly opened state of first vent 221 formed in stationary perforated partition plate 22 to realize a different second restriction to flow of pressurized fuel vapor through first vent 221 so as to establish a SECOND OPENED mode of fuel tank isolation valve 12 as shown in FIG. 8. This activity causes a relatively greater DISCHARGE stream (D) of pressurized fuel vapor to be discharged from the tank-side chamber 38 into the canister-side chamber 39 via SECOND partly opened first vent 221 and second vent 222 formed in stationary perforated partition plate 22 during a relatively later stage of refueling of fuel tank 16 after pressure of the pressurized fuel vapor extant in the tank passageway 33P has risen to at least the relatively higher second pressure (P2) so that a greater volume of pressurized fuel vapor flowing in the tank passageway 33P into the tank-side chamber 39 can be discharged through first and second vents 221, 222 formed in stationary perforated partition plate 22 to flow through the medial vapor-transfer passageway 34P into the canister passageway 35P and then flow to fuel-vapor recovery canister 18 to dissipate pressure in fuel tank 16.

Multi-stage flow controller 24 is further configured as shown in FIG. 9 in accordance with the present disclosure to provide for temporarily opening second vent 222 formed in stationary perforated partition plate 22 while first vent 221 is closed so as to establish a THIRD OPENED mode of fuel tank isolation valve 12 during development of unwanted vacuum conditions in fuel tank 16 as shown in FIG. 10. This activity allows fuel vapor including atmospheric air to flow from fuel-vapor recovery canister 18 to fuel tank 16 via vapor conduit 14 through second vent 221 formed in stationary perforated partition plate 22 owing to development of vacuum conditions in fuel tank 16 so that fuel vapor flowing in the canister passageway 35P flows through the medial vapor-transfer passageway 34P into the tank passageway 33P and then flows into fuel tank 16 to dissipate the unwanted vacuum conditions in fuel tank 16.

Multi-stage flow controller 24 is still further configured as shown in FIG. 11 in accordance with the present disclosure to provide for temporarily restricting flow of pressurized fuel vapor extant in the tank-side chamber 38 through first vent 221 formed in stationary perforated partition plate 22 to realize a third restriction to flow of pressurized fuel vapor through first vent 221 that is characterized by THIRD partly opened state that is different from each of the first and second restrictions to flow of pressurized fuel vapor through first vent 221 while second vent 222 is closed so as to establish a FOURTH OPENED mode of fuel tank isolation valve 12 during development of unwanted over-pressure conditions in fuel tank 16 after pressure of pressurized fuel vapor extant in the tank passageway 33P has risen above the relatively higher second pressure (P2) to at least a third pressure (P3) as shown in FIG. 12. This activity causes a stream of over-pressure fuel vapor to be discharged from the tank-side chamber 38 into the canister-side chamber 39 via THIRD partly opened first vent 221 formed in stationary perforated partition plate 22 so that over-pressure fuel vapor flowing in the tank passageway 33P flows through the medial vapor-transfer passageway 34P into the canister passageway 33P and then flows to fuel-vapor recovery canister 18 to dissipate unwanted over-pressure conditions in fuel tank 16.

Vapor conduit 14 includes a canister pipe 35 formed to include the canister passageway 35P and adapted to be coupled at an outer end thereof via canister conduit 15 to fuel-vapor recovery canister 18 and a tank pipe 33 formed to include the tank passageway 33P and adapted to be coupled at an outer end thereof via tank conduit 13 to fuel tank 16 as shown in FIG. 1. Vapor conduit 14 also includes a valve housing 34 formed to include the medial vapor-transfer passageway 34P. Valve housing 34 is coupled to inner ends of each of the canister and tank pipes 35, 33 to place the canister-side chamber 39 of the medial vapor-transfer passageway 34P in fluid communication with the canister passageway 35P and the tank-side chamber 38 in fluid communication with the tank passageway 33P.

Multi-stage flow controller 24 includes tank-side and canister-side vapor-flow regulators 24T, 24C and a movable armature 24A that is operationally linked to a solenoid 26 as shown in FIG. 1. Tank-side vapor-flow regulator 24T is mounted for movement in the tank-side chamber 38 of the medial vapor-transfer passageway 34P relative to valve housing 34 toward and away from stationary perforated partition plate 22 to open and close second vent 222 formed in stationary perforated partition plate 22. Canister-side vapor-flow regulator 24C is mounted for movement in the canister-side chamber 39 of the medial vapor-transfer passageway 34P relative to valve housing 34 toward and away from tank-side vapor-flow regulator 24T to regulate flow of pressurized fuel vapor through first vent 221 formed in stationary perforated partition plate 22. Movable armature 24A is mounted for up-and-down movement in an armature-receiving channel 24ARC formed in the tank-side vapor-flow regulator 24T relative to stationary perforated partition plate 22 between a closed position extending through first vent 221 to engage canister-side vapor-flow regulator 24C while canister-side vapor-flow regulator 24C engages second-side surface 22U of stationary perforated partition plate 22 to close first vent 221 when fuel tank isolation valve 12 is in the normally CLOSED mode and several opened positions disengaging canister-side vapor-flow regulator 24C to allow pressurized fuel vapor extant in the tank-side chamber 38 to flow through first vent 221 to the canister-side chamber 39. In the normally CLOSED mode, no part of moveable armature 24A touches or engages regulator 24T to close orbital vent apertures 221, 222 of plate 22.

Canister-side vapor-flow regulator 24C is formed to include a vapor-flow orifice 24CO shown in FIGS. 2A and 2B that communicates with first vent 221 to receive pressured fuel vapor discharged through first vent 221 when canister-side vapor-flow regulator 24C is arranged in the canister-side chamber 39 to engage second-side surface 22U of stationary perforated partition plate 22 as suggested in FIGS. 5 and 6. Movable armature 24A includes a distal tip 24AT that is arranged to engage canister-side vapor-flow regulator 24C to close vapor-flow orifice 24CO to block discharge of pressurized fuel vapor extant in first vent 221 into the canister-side chamber 39 when fuel tank isolation valve 12 is in the normally CLOSED mode and that is separated from vapor-flow orifice 24CO by a first distance when fuel tank isolation valve 12 is in the FIRST OPENED mode as suggested in FIG. 6A and that is separated from vapor-flow orifice 24CO by a second distance that is greater than the first distance when the fuel tank isolation valve 12 is in the SECOND OPENED mode as suggested in FIG. 8.

Distal tip 24AT of movable armature 24A is arranged to extend into first vent 221 when the fuel tank isolation valve 12 is in the FIRST OPENED mode as suggested in FIG. 6A and to lie outside of first vent 221 when the fuel tank isolation valve 12 is in the SECOND OPENED mode as suggested in FIG. 8. Distal tip 24AT of movable armature 24A is arranged to extend into first vent 221 to assume a first position in first vent 221 when fuel tank isolation valve 12 is in the FIRST OPENED mode as suggested in FIG. 6A and a different second position in first vent 221 when fuel tank isolation valve 12 is in the FOURTH OPENED mode as suggested in FIG. 12.

Distal tip 24AT of movable armature 24A includes a downwardly facing bottom surface facing toward the vapor-flow orifice 24CO formed in canister-side vapor-flow regulator 24C. The downwardly facing bottom surface of distal tip 24AT is arranged to lie in close proximity to and at a first distance from first-side surface 24T of stationary perforated partition plate 22 when fuel tank isolation valve 12 is in the FIRST OPENED mode as suggested in FIGS. 5, 6, and 6A and to lie in close proximity to second-side surface 22U of stationary perforated partition plate 22 and at a second distance from first-side surface 22T of stationary perforated partition plate 22 that is greater than first distance when fuel tank isolation valve 12 is in the FOURTH OPENED mode as suggested in FIGS. 11 and 12.

Movable armature 24A includes a distal tip 24AT that is arranged to engage canister-side vapor-flow regulator 24C to close a vapor-flow orifice 24CO that is formed in canister-side vapor-flow regulator 24C to communicate with first vent 221 and the canister-side chamber 39 when movable armature 24A is in the closed position and the canister-side vapor-flow regulator 24C is moved to engage second-side surface 22U of stationary perforated partition plate 22 as suggested in FIGS. 4 and 4A and also in FIG. 10. This activity causes movable armature 24A to cooperate with canister-side vapor-flow regulator 24C to close first vent 221 when fuel tank isolation valve 12 is in the normally CLOSED mode and the THIRD OPENED mode.

Movable armature 22A further includes a top end arranged to lie in a spaced-apart relation to distal tip 24AT as suggested in FIG. 2A. Multi-stage flow controller 24 further includes a compression spring 40 having a first end engaging top end of movable armature 24A and an opposite second end acting against the top valve-housing closure 28 of hollow flow-management unit 11 normally to urge movable armature 24A in the medial vapor-transfer passageway 34P toward canister-side vapor-flow regulator 24C to cause distal tip 24AT to close the vapor-flow orifice 24CO formed in canister-side vapor-flow regulator 24C as suggested in FIGS. 4 and 10.

Movable armature 24A further includes an elongated body 24B arranged to interconnect top end and distal tip 24AT and a radially outwardly extending lift flange 24F having an inner end coupled to the elongated body 24B as suggested in FIG. 2A. Lift flange 24F is arranged to extend radially outwardly from a central vertical axis 34A extending through body 24B and first vent 221. Tank-side vapor-flow regulator 24T further includes a tank-side compression spring 54 having a first end engaging movable tank-side closure 50, 52 and an opposite second end acting against the hollow flow-management unit 11 normally to urge movable tank-side closure 50, 52 to engage first-side surface 22T of stationary perforated partition plate 22 to close second vent 222 as shown in FIGS. 1 and 3. Movable tank-side closure 50, 52 further includes a sleeve 52S arranged to surround a portion of the elongated body 24B of movable armature 24A during movement of movable armature 24A relative to valve housing 34. A lift catch 24LC is coupled to sleeve and arranged to extend radially inwardly toward central vertical axis 34A to engage the radially outwardly extending lift flange 24F of movable armature 24A during upward movement of distal tip 24AT of movable armature 24A away from movable tank-side closure 50, 52 in response to energization of solenoid 26 included in fuel tank isolation valve 12 and limited to movable armature 24A when fuel tank isolation valve 12 is in the FIRST OPENED mode and the SECOND OPENED mode.

In the normally CLOSED mode, elongated body 24B, distal tip 24AT, and lift flange 24F do not engaged with top hat-shaped spring cap 52. Rather spring 54 biases top hat-shaped spring cap 52 into engagement with topside 22T of plate 22. Top hat-shaped spring cap 52 has openings so that lift flange 24F of moveable armature 24A does not engage any part of tank-side vapor-flow regulator 24T. It is only when valve 12 is in second opened mode does moveable armature 24A engage radially inwardly extending lift catch 24LC of top hat-shaped spring cap 52 to compress spring 54 and open orbital vent apertures 221, 222.

Movable tank-side closure 50, 52 is top-hat-shaped and further includes an annular base 52B coupled to sleeve 52S and arranged to extend radially outwardly away from sleeve 52S to face toward an annular valve seat 34V formed in valve housing 34. First end of tank-side compression spring 54 engages annular base of movable tank-side closure. A portion of tank-side compression spring 54 is coiled to surround sleeve.

Distal tip 24AT of movable armature 24A is located as suggested in FIGS. 5, 6, and 6A in a first of the several opened positions the tank-side chamber 38 outside of first vent 221 to position distal tip 24AT at a first distance from canister-side vapor-flow regulator 24C to lie in spaced-apart relation to vapor-flow orifice 24CO and to lie in close proximity to second-side surface 22U of stationary perforated partition plate 22 to establish the first restriction to flow of fuel vapor through first vent 221 when fuel tank isolation valve 12 is in the FIRST OPENED mode. This position of distal tip 24AT establishes the FIRST partly opened state of first vent 221.

Distal tip 24AT of the movable armature 24A is located as suggested in FIGS. 7 and 8 in a raised second of the several opened positions in the tank-side chamber 39 to position distal tip 24AT at a second distance from canister-side vapor-flow regulator 24C that is greater than the first distance while canister-side vapor-flow regulator 24C remains engaged with second-side surface 22U of stationary perforated partition plate 22 to cause pressurized fuel vapor exiting first vent 221 to flow through the vapor-flow orifice 24CO formed in canister-side vapor-flow regulator 24C to establish the second restriction to flow of pressurized fuel vapor through first vent 221 when fuel tank isolation valve 12 is in the SECOND OPENED mode. This position establishes the SECOND partly opened state of first vent 221.

Tank-side vapor-flow regulator 24T is arranged as suggested in FIGS. 9 and 10 to engage first-side surface 22T of stationary perforated partition plate 22 to close second vent 222 formed in stationary perforated partition plate 22 when fuel tank isolation valve 12 is in the normally CLOSED mode. Tank-side vapor-flow regulator 24T is arranged to disengage first-side surface 22T of stationary perforated partition plate 22 when fuel tank isolation valve 12 is in the THIRD OPENED mode.

Canister-side vapor-flow regulator 24C is arranged as suggested in FIGS. 11 and 12 to disengage second-side surface 22U of stationary perforated partition plate 22 while distal tip 24AT of movable armature 24A lies in first vent 221 formed in stationary perforated partition plate 22 in a third of the several opened positions to establish the third restriction of flow of pressurized fuel vapor through first vent 221 and while tank-side vapor-flow regulator 24T is arranged to engage first-side surface 22T of stationary perforated partition plate 22 to close second vent 222 formed in stationary perforated partition plate 22 when fuel tank isolation valve 12 is in the FOURTH OPENED mode. This position establishes the THIRD partly opened state of first vent 221.

Each of tank-side and canister-side vapor-flow regulators 24T, 24C is arranged to move relative to valve housing 34, stationary perforated partition plate 22, and one another along a single vertical axis 34A. Single vertical axis 34A extends through the tank-side chamber 39, the first vent 221 formed in stationary perforated partition plate 22, and the canister-side chamber 39.

Multi-stage flow controller 24 further includes a movable armature 24A mounted for movement in an armature-receiving channel 24ARC formed in tank-side vapor-flow regulator 24T relative to valve housing 34 and tank-side vapor-flow regulator 24T and toward and away from stationary perforated partition plate 22. Canister-side vapor-flow regulator 24C includes a fuel-vapor flow restrictor that is formed to include a small-diameter vapor-flow orifice 24CO that is relatively smaller in size than a central vent aperture 221 established by first vent 221 and a seal ring 64 arranged to surround the small-diameter vapor-flow orifice 24CO and to extend toward second-side surface 22U of stationary perforated partition plate 22. The small-diameter vapor-flow orifice 24CO is located to open into a fuel-vapor vent passageway 24VP formed in canister-side vapor-flow regulator 24C to communicate with the canister-side chamber 39 formed in valve housing 34 and also located to communicate with the central vent aperture 221 established by first vent 221 formed in stationary perforated partition plate 22 when canister-side vapor-flow regulator 24C is moved in the canister-side chamber 39 to engage second-side surface 22U of stationary perforated partition plate 22 so as to conduct pressurized fuel vapor from the tank-side chamber 38 to the canister-side chamber 39 via the central vent aperture 221, small-diameter vapor-flow orifice 24CO, and fuel-vapor vent passageway 24VP.

Movable armature 24A includes a distal tip 24AT arranged to move relative to the stationary perforated partition plate 22 between projected, retracted, and intermediate positions. Distal tip 24AT is arranged to face downwardly toward the vapor-flow orifice 24CO formed in canister-side vapor-flow regulator 24C.

In the projected positon, movable armature 24A extends into the central vent aperture 221 formed in stationary perforated partition plate 22 to engage seal ring 64 included in canister-side vapor-flow regulator 24C as suggested in FIGS. 4 and 10. This engagement closes the small-diameter vapor-flow orifice 24CO formed in fuel-vapor flow restrictor to block flow of pressurized fuel vapor extant in the tank-side chamber 39 and in the central vent aperture 221 formed in stationary perforated partition plate 22 through the small-diameter vapor-flow orifice 24CO formed in canister-side vapor-flow regulator 24C when the fuel tank isolation valve 12 is in the NORMALLY CLOSED mode and to block flow of fuel vapor extant in the canister-side chamber 39 through the small-diameter vapor-flow orifice 24CO formed in canister-side vapor-flow regulator 24C and first vent 221 formed in stationary perforated partition plate 22 when fuel tank isolation valve 12 is in the THIRD OPENED mode.

In the retracted position, movable armature 24A is withdrawn from the central vent aperture 221 formed in stationary perforated partition plate 22 as suggested in FIGS. 7 and 8. This withdrawal allows flow of the relatively greater DISCHARGE stream (D) of pressurized fuel vapor to be discharged from the tank-side chamber 39 through first and second vents 221, 222 and through small-diameter vapor flow orifice 24CO and along the fuel-vapor vent passageway 24VP into the canister-side chamber 39 in transit to fuel-vapor recovery canister 24C via the canister passageway 35P when movable armature 24A is in the SECOND OPENED mode.

The intermediate position is located between the projected and retracted positions as shown in FIGS. 5 and 6. Placement of distal tip 24AT in the intermediate position causes the BLEED stream (B) of pressurized fuel vapor to be discharged from the tank-side chamber 38 into the canister-side chamber 39 via first vent 221 when fuel tank isolation valve 12 is in the FIRST OPENED mode.

Each of the movable armature 24A and tank-side and canister-side vapor-flow regulators 24T, 24C is arranged to move relative to valve housing 34, stationary perforated partition plate 22, and one another along a single vertical axis 34A that extends through the tank-side chamber 38, the first vent 221 formed in stationary perforated partition plate 22, the small-diameter vapor-flow orifice 24CO formed in fuel-vapor flow restrictor of canister-side vapor-flow regulator 24C, and the canister-side chamber 39. Each of the tank-side vapor-flow regulator 24T, movable armature 24A, and canister-side vapor-flow regulator 24C is mounted in the medial vapor-transfer passageway 34P formed in valve housing 34 for independent movement relative to one another and to stationary perforated partition plate 22 during a mode change of fuel tank isolation valve 12 between the normally CLOSED mode and each of the FIRST, SECOND, THIRD AND FOURTH OPENED modes.

Stationary perforated partition plate 22 of fuel tank isolation valve 12 is coupled to valve housing 34 of vapor conduit 14 and arranged to lie wholly within the medial vapor-transfer passageway 34P formed in the valve housing 34. The first vent 221 is established by a central vent aperture 221 formed in stationary perforated partition plate 22 and second vent 222 is established by a series of orbital vent apertures 222a-f formed in stationary perforated partition plate 22 and arranged to surround central vent aperture 221.

In hybrid vehicles, the internal combustion engine included in the vehicle operates intermittently and the fuel tank system closed off from the surrounding atmosphere, which may create a need to control/regulate the fuel vapor in the system. Hybrid vehicles also typically have relatively small fuel tanks compared to other vehicles. When the vehicle uses the electric motor (i.e. the engine is not being used), the pressure of the fuel vapor in the fuel tank may increase.

This may make opening fuel system lines when ready for use a challenge. Further, if the increased pressure in the fuel tank is not released, the fuel tank may become damaged or even explode. Fuel tank isolation valve 12 controls the flow fuel vapor and air between fuel tank 16 and fuel-vapor recovery canister 18 used to store the pressurized fuel vapor to release built up pressure in fuel tank 16 at different stages.

Fuel tank isolation valve 12 isolates canister 18 from the fuel tank 16 in the PHEV. In the normally CLOSED mode, valve 12 blocks the flow of fuel vapor from tank 16 to canister 18 as shown in FIG. 3.

Fuel tank isolation valve 12 has four different open modes (the first opened mode as shown in FIG. 5, the second opened mode as shown in FIG. 7, the third opened mode as shown in FIG. 9, and the fourth opened mode as shown in FIG. 11) to regulate the flow of fuel vapor between fuel tank 16 and canister 18 based on different conditions of the system. In the case of over-pressure conditions, valve 12 changes to the fourth mode to allow a release a large amount of pressure from fuel tank 16.

Conversely, if there is vacuum conditions in fuel tank 16, fuel tank isolation valve 12 may change to third opened mode to alleviate unwanted vacuum conditions. Once the vehicle switches to using engine 20, fuel tank isolation valve 12 may change to one of first opened mode, second opened mode, and fourth opened mode to allow the fuel vapor to flow from fuel tank 16 through canister 18 and to the engine to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 12 changes from closed mode to first opened mode to vent some displaced fuel vapor from fuel tank 16. After refueling begins and fuel is being discharged at a constant rate into fuel tank 16, fuel tank isolation valve 12 changes to second opened mode to vent more displaced fuel vapor.

In the normally closed position, no part of moveable armature 24A touches or engages regulator 24T to close orbital vent apertures 221, 222 of plate 22. Rather spring 54 biases regulator 24T into engagement with topside 22T of plate 22. Regulator 24T has openings so that lift flange 24F of moveable armature 24A does not engage any part of tank-side vapor-flow regulator 24T. It is only when valve 12 is in second opened mode does moveable armature 24A engage radially inwardly extending lift catch 24LC of regulator 24T to compress spring 54 and open orbital vent apertures 221, 222.

The invention claimed is:

1. A tank venting system comprising
a hollow flow-management unit including a vapor conduit formed to include a canister passageway adapted to be coupled in fluid communication to a fuel-vapor recovery canister, a tank passageway adapted to be coupled in fluid communication to a fuel tank, and a medial vapor-transfer passageway arranged to interconnect the canister and tank passageways in fluid communication to transfer fuel vapor flowing from a fuel tank associated with the tank passageway through the tank and canister passageways to a fuel-vapor recovery canister associated with the canister passageway and to transfer fuel vapor flowing from the fuel-vapor recovery canister to the fuel tank through the canister and tank passageways, and a fuel tank isolation valve including a stationary perforated partition plate mounted in the medial vapor-transfer passageway formed in the vapor conduit to partition the medial vapor-transfer passageway so as to establish a tank-side chamber communicating with the tank passageway and a canister-side chamber communicating with the canister passageway to cause a first-side surface of the stationary perforated partition plate to intercept fuel vapor flowing in the medial vapor-transfer passageway from the tank passageway to the canister passageway and to cause an opposite second-side surface of the stationary perforated partition plate to intercept fuel vapor flowing in the medial vapor-transfer passageway from the canister passageway to the tank passageway, the stationary perforated partition plate being formed to include a first vent opening through the first-side surface into the tank-side chamber of the medial vapor-transfer passageway and also opening through the second-side surface into the canister-side chamber of the medial vapor-transfer passageway, the stationary perforated partition plate also being formed to include a second vent separated from the first vent to open through the first-side surface into the tank-side chamber and also to open through the second-side surface into the canister-side chamber, the fuel tank isolation valve further including multi-stage flow controller means for normally closing the first and second vents formed in the stationary perforated partition plate to block flow of fuel vapor through each of the first and second vents to establish a normally closed mode of the fuel tank isolation valve so that fuel vapor cannot flow through the vapor conduit between the fuel tank and the fuel-vapor recovery canister so as to isolate the fuel tank normally from the fuel vapor recovery canister, for temporarily restricting flow of pressurized fuel vapor extant in the tank-side chamber through the first vent formed in the stationary perforated partition plate into the canister-side chamber to initiate partial opening of the first vent to realize a first restriction to flow of pressurized fuel vapor through the first vent while the second vent remains closed so as to establish a first opened mode of the fuel tank isolation valve to cause a bleed stream of pressurized fuel vapor to be discharged from the tank-side chamber into the canister-side chamber via the first vent formed in the stationary perforated partition plate during an early stage of refueling the fuel tank while the pressure of the pressurized fuel vapor in the tank passageway remains below a relatively higher second pressure so that pressurized fuel vapor is admitted into the canister-side chamber to increase pressure extant in the canister-side chamber, for temporarily opening the second vent formed in the stationary perforated partition plate while restricting flow of pressurized fuel vapor through the first vent to realize different second restriction to flow of pressurized fuel vapor through the first vent formed in the stationary perforated partition plate so as to establish a second opened mode of the fuel tank isolation valve to cause a relatively greater discharge stream of pressurized fuel vapor to be discharged from the tank-side chamber into the canister-side chamber via the first and second vents formed in the stationary perforated partition plate during a relatively later stage of refueling of the fuel tank after pressure of the pressurized fuel vapor extant in the tank passageway has risen to at least the relatively higher second pressure so that a greater volume of pressurized fuel vapor flowing in the tank passageway into the tank-side chamber can be discharged through the first and second vents formed in the stationary perforated partition plate to flow through the medial vapor-transfer passageway into the canister passageway and then flow to the fuel-vapor recovery canister to dissipate pressure in the fuel tank, for temporarily opening the second vent formed in the stationary perforated partition plate while the first vent is closed so as to establish a third opened mode of the fuel tank isolation valve during development of unwanted vacuum conditions in the fuel tank to allow fuel vapor including atmospheric air to flow from the fuel-vapor recovery canister to the fuel tank via the vapor conduit through the second vent formed in the stationary perforated partition plate so that fuel vapor flowing in the canister passageway flows through the medial vapor-transfer passageway into the tank passageway and then flows into the fuel tank to dissipate the unwanted vacuum conditions in the fuel tank, and for temporarily restricting flow of pressurized fuel vapor extant in the tank-side chamber through the first vent formed in the stationary perforated partition plate to realize a third restriction to flow of pressurized fuel vapor through the first vent that is different from each of the first and second restrictions to flow of pressurized fuel vapor through the first vent while the second vent is closed so as to establish a fourth opened mode of the fuel tank isolation valve during development of unwanted over-pressure conditions in the fuel tank after pressure of pressurized fuel vapor extant in the tank passageway has risen above the relatively higher second pressure to at least a third pressure to cause a stream of over-pressure fuel vapor to be discharged from the tank-side chamber into the canister-side chamber via the first vent formed in the stationary partition plate so that over-pressure fuel vapor flowing in the tank passageway flows through the medial vapor-transfer passageway into the canister passageway and then flows to the fuel-vapor recovery canister to dissipate unwanted over-pressure conditions in the fuel tank.

2. The tank venting system of claim 1, wherein the vapor conduit includes a canister pipe formed to include the canister passageway and adapted to be coupled at an outer end thereof to the fuel-vapor recovery canister, a tank pipe formed to include the tank passageway and adapted to be coupled at an outer end thereof to the fuel tank, and a valve housing formed to include the medial vapor-transfer passageway and coupled to inner ends of each of the canister and tank pipes to place the canister-side chamber of the medial vapor-transfer passageway in fluid communication with the canister passageway and the tank-side chamber in fluid communication with the tank passageway, and wherein the multi-stage flow controller means includes a tank-side vapor-flow regulator mounted for movement in the tank-side chamber of the medial vapor-transfer passageway relative to the valve housing toward and away from the stationary perforated partition plate to open and close the second vent formed in the stationary perforated partition plate.

3. The tank venting system of claim 2, wherein the multi-stage flow controller further includes a canister-side vapor-flow regulator mounted for movement in the canister-side chamber of the medial vapor-transfer passageway relative to the valve housing toward and away from the tank-side vapor-flow regulator to regulate flow of pressurized fuel vapor through the first vent formed in the stationary perforated partition plate.

4. The tank venting system of claim 3, wherein the multi-stage flow controller further includes a movable armature mounted for up-and-down movement in an armature-receiving channel formed in the tank-side vapor-flow regulator relative to the stationary perforated partition plate between a closed position extending through the first vent to engage the canister-side vapor-flow regulator while the canister-side vapor-flow regulator engages the second-side surface of the stationary perforated partition plate to close the first vent when the multi-stage flow controller is in the normally closed mode and several opened positions disengaging the canister-side vapor-flow regulator to allow pressurized fuel vapor extant in the tank-side chamber to flow through the first vent to the canister-side chamber.

5. The tank venting system of claim 4, wherein the canister-side vapor-flow regulator is formed to include a vapor-flow orifice that communicates with the first vent to receive pressured fuel vapor discharged through the first vent when the canister-side vapor-flow regulator is arranged in the canister-side chamber to engage the second-side surface of the stationary perforated partition plate and the movable armature includes a distal tip that is arranged to engage the canister-side vapor-flow regulator to close the vapor-flow orifice to block discharge of pressurized fuel vapor extant in the first vent into the canister-side chamber when the multi-stage flow controller is in the normally closed mode, and that is separated from the vapor-flow orifice by a first distance when the fuel tank isolation valve is in the first opened mode and that is separated from the vapor-flow orifice by a second distance that is greater than the first distance when the fuel tank isolation valve is in the second opened mode.

6. The tank venting system of claim 5, wherein the distal tip of the movable armature is arranged to extend into the first vent when the fuel tank isolation valve is in the first opened mode and to lie outside of the first vent when the fuel tank isolation valve is in the second opened mode.

7. The tank venting system of claim 5, wherein the distal tip of the movable armature is arranged to extend into the first vent to assume a first position in the first vent when the fuel tank isolation valve is in the first opened mode and a different second position in the first vent when the fuel tank isolation valve is in the fourth opened mode.

8. The tank venting system of claim 7, wherein the distal tip includes a downwardly facing bottom surface facing toward the vapor-flow orifice formed in the canister-side vapor-flow regulator and the downwardly facing bottom surface of the distal tip is arranged to lie in close proximity to and at a first distance from the first-side surface of the stationary perforated partition plate when the fuel tank isolation valve is in the first opened mode and to lie in close proximity to the second-side surface of the stationary perforated partition plate and at a second distance from the first-side surface of the stationary perforated partition plate that is greater than the first distance when the fuel tank isolation valve is in the fourth opened mode.

9. The tank venting system of claim 4, wherein the movable armature includes a distal tip that is arranged to engage the canister-side vapor-flow regulator to close a vapor-flow orifice that is formed the canister-side vapor-flow regulator to communicate with the first vent and the canister-side chamber when the movable armature is in the closed position and the canister-side vapor-flow regulator is moved to engage the second-side surface of the stationary perforated partition plate to cause the movable armature to cooperate with the canister-side vapor-flow regulator to close the first vent when the fuel tank isolation valve is in the normal closed mode and the third opened mode.

10. The tank venting system of claim 9, wherein the movable armature further includes a top end arranged to lie in a spaced-apart relation to the distal tip and the multi-stage flow controller further includes a compression spring having a first end engaging the top end of the movable armature and an opposite second end acting against the hollow flow-management unit normally to urge the movable armature in the medial vapor-transfer passageway toward the canister-side vapor-flow regulator to cause the distal tip to close the vapor-flow orifice formed in the canister-side vapor-flow regulator.

11. The tank venting system of claim 10, wherein the movable armature further includes an elongated body arranged to interconnect the top end and the distal tip and a radially outwardly extending lift flange having an inner end coupled to the elongated body and being arranged to extend radially outwardly from a central vertical axis extending through the body and the first vent, the tank-side vapor-flow regulator further includes a tank-side compression spring having a first end engaging the movable tank-side closure and an opposite second end acting against the hollow flow-management unit normally to urge the movable tank-side closure to engage the first-side surface of the stationary perforated partition plate to close the second vent, the movable tank-side closure further includes a sleeve arranged to surround a portion of the elongated body of the movable armature during movement of the movable armature relative to the valve housing, and a lift catch coupled to the sleeve and arranged to extend radially inwardly toward the central vertical axis to engage the radially outwardly extending lift flange of the movable armature during upward movement of the movable armature relative to the movable tank-side closure in response to energization of a solenoid included in the fuel tank isolation valve and linked to the movable armature when the fuel tank isolation valve is in the first and second opened modes.

12. The tank venting system of claim 11, wherein the movable tank-side closure is top-hat-shaped and further includes an annular base coupled to the sleeve and arranged to extend radially outwardly away from the sleeve to face toward an annular valve seat formed in the valve housing, the first end of the tank-side compression spring engages the annular base of the movable tank-side closure, and a portion of the tank-side compression spring is coiled to surround the sleeve.

13. The tank venting system of claim 9, wherein the distal tip of the movable armature is located in a first of the several opened positions the tank-side chamber outside of the first vent to position the distal tip at a first distance from the canister-side vapor-flow regulator to lie in spaced-apart relation to the vapor-flow orifice and to lie in close proximity to the second-side surface of the stationary perforated partition plate to establish the first restriction to flow of fuel vapor through the first vent when the fuel tank isolation valve is in the first opened mode.

14. The tank venting system of claim 13, wherein the distal tip of the movable armature is located in a raised second of the several opened positions in the tank-side chamber to position the distal tip at a second distance from the canister-side vapor-flow regulator that is greater than the first distance while the canister-side vapor-flow regulator remains engaged with the second-side surface of the stationary perforated partition plate to cause pressurized fuel vapor exiting the first vent to flow through the vapor-flow orifice formed in the canister-side vapor-flow regulator to establish the second restriction to flow of pressurized fuel vapor through the first vent when the fuel tank isolation valve is in the second opened mode.

15. The tank venting system of claim 9, wherein the tank-side vapor-flow regulator is arranged to engage the first-side surface of the stationary perforated partition plate to close the second vent formed in the stationary perforated partition plate when the fuel tank isolation valve is in the normal closed mode and to disengage the first-side surface of the stationary perforated partition plate when the fuel tank isolation valve is in the third opened mode.

16. The tank venting system of claim 9, wherein the canister-side vapor-flow regulator is arranged to disengage the second-side surface of the stationary perforated partition plate while the distal tip of the movable armature lies in the first vent formed in the stationary perforated partition plate in a third of the several opened positions to establish the third restriction of flow of pressurized fuel vapor through the first vent and while the tank-side vapor-flow regulator is arranged to engage the first-side surface of the stationary perforated partition plate to close the second vent formed in the stationary perforated partition plate when the fuel tank isolation valve is in the fourth opened mode.

17. The tank venting system of claim 3, wherein each of the tank-side and canister-side vapor-flow regulators are arranged to move relative to the valve housing, the stationary perforated partition plate, and one another along a single vertical axis that extends through the tank-side chamber, the first vent formed in the stationary perforated partition plate, and the canister-side chamber.

18. The tank venting system of claim 17, wherein the second vent comprises a series of circumferentially spaced-apart orbital vent apertures formed in the stationary perforated partition plate to surround the first vent and the single vertical axis.

19. The tank venting system of claim 17, wherein the multi-stage flow controller further includes a movable armature mounted for movement in an armature-receiving channel formed in the tank-side vapor-flow regulator relative to the valve housing and the tank-side vapor-flow regulator and toward and away from the stationary perforated partition plate, the canister-side vapor-flow regulator includes a fuel-vapor flow restrictor that is formed to include a small-diameter vapor-flow orifice that is relatively smaller in size than a central vent aperture established by the first vent and a sealing ring arranged to surround the small-diameter vapor-flow orifice and to extend toward the second-side surface of the stationary perforated partition plate, the small-diameter vapor-flow orifice is located to open into a fuel-vapor vent passageway formed in the canister-side vapor-flow regulator to communicate with the canister-side chamber formed in the valve housing and also located to communicate with the central vent aperture established by the first vent formed in the stationary perforated partition plate when the canister-side vapor-flow regulator is moved in the canister-side chamber to engage the second-side surface of the stationary perforated partition plate so as to conduct pressurized fuel vapor from the tank-side chamber to the canister-side chamber via the central vent aperture, small-diameter vapor-flow orifice, and fuel-vapor vent passageway, and wherein the movable armature includes a distal tip arranged to move relative to the stationary perforated partition plate between a projected positon extending into the central vent aperture formed in the stationary perforated partition plate to engage the sealing ring included in the canister-side vapor-flow regulator to close the small-diameter vapor-flow orifice formed in the fuel-vapor flow restrictor to block flow of pressurized fuel vapor extant in the tank-side chamber and in the central vent aperture formed in the stationary perforated partition plate through the small-diameter vapor-flow orifice formed in the canister-side vapor-flow regulator when the fuel tank isolation valve is in the normally closed mode and to block flow of fuel-vapor extant in the canister-side chamber through the small-diameter vapor-flow orifice formed in the canister-side vapor-flow regulator and the first vent formed in the stationary perforated partition plate when the fuel tank isolation valve is in the third opened mode, a retracted position withdrawn from the central vent aperture formed in the stationary perforated partition plate to allow flow of the relatively greater discharge stream of pressurized fuel vapor to be discharged from the tank-side chamber through the first and second vents and through the small-diameter vapor flow orifice and along the fuel-vapor vent passageway into the canister-side chamber in transit to the fuel-vapor recovery canister via the canister passageway when the fuel tank isolation valve is in the second opened mode, and an intermediate position located between the projected and retracted positions to cause the bleed stream of pressurized fuel vapor to be discharged from the tank-side chamber into the canister-side chamber via the first vent when the fuel tank isolation valve is in the first opened mode.

20. The tank-venting system of claim 19, wherein each of the movable armature and tank-side and canister-side vapor-flow regulators is arranged to move relative to the valve housing, the stationary perforated partition plate, and one another along a single vertical axis that extends through the tank-side chamber, the first vent formed in the stationary perforated partition plate, the small-diameter vapor-flow orifice formed in the fuel-vapor flow restrictor of the canister-side vapor-flow regulator, and the canister-side chamber.

21. The tank venting system of claim 19, wherein each of the tank-side vapor-flow regulator, movable armature, and canister-side vapor-flow regulator is mounted in the medial vapor-transfer passageway formed in the valve housing for independent movement relative to one another and to the stationary perforated partition plate during a mode change of the fuel tank isolation valve between the normally closed mode and each of the first, second, third and fourth opened modes.

22. The tank venting system of claim 2, wherein the stationary perforated partition plate of the fuel tank isolation valve is coupled to the valve housing of the vapor conduit and arranged to lie wholly within the medial vapor-transfer passageway formed in the valve housing.

23. The tank venting system of claim 22, wherein the first vent is established by a central vent aperture formed in the stationary perforated partition plate and the second vent is established by a series of orbital vent apertures formed in the stationary perforated partition plate and arranged to surround the central vent aperture.

24. The tank venting system of claim 22, wherein the inner diameter of the central vent aperture is greater than an inner diameter of each of the orbital vent apertures.

25. The tank venting system of claim 24, wherein an outer perimeter edge of the stationary perforated partition plate of the fuel tank isolation valve is coupled to a companion interior boundary wall of the valve housing to block movement of the stationary perforated partition plate relative to the valve housing of the vapor conduit.

26. The tank venting system of claim 2, wherein a boundary wall of the valve housing of the vapor conduit is arranged to surround a single vertical axis that extends through the valve housing and the first vent formed in the stationary perforated partition plate, the boundary wall includes a top end formed to include a top aperture opening into an interior region bounded by the boundary wall and containing the stationary perforated partition plate and an opposite bottom end arranged to lie in spaced-apart relation to the top end and formed to include a bottom aperture opening into the interior region, and wherein the hollow flow-management unit further includes a first valve-housing closure coupled to the top end of the boundary wall to close the top aperture and establish the tank-side chamber in the interior region of the valve housing between the first valve-housing closure and the stationary perforated partition plate and to locate the tank-side vapor-flow regulator between the first valve-housing closure and the stationary perforated partition plate.

27. The tank venting system of claim 26, wherein the tank-side vapor-flow regulator includes a movable tank-side closure and a tank-side compression spring having a first end engaging the movable tank-side closure and an opposite second end acting against the first valve-housing closure normally to urge the movable tank-side closure to engage the first-side surface of the stationary perforated partition plate to close the second vent formed in the stationary perforated partition plate.

28. The tank venting system of claim 27, wherein the movable tank-side closure is top-hat-shaped and formed to include an annular seal support engaged to a topside the first end of the tank-side compression spring, an upstanding cylindrical sleeve coupled to the annular seal support, and a sealing ring coupled to an underside of the annular seal support and arranged normally to engage the first-side surface of the stationary perforated partition plate to close the second vent.

29. The tank venting system of claim 28, wherein the tank-side compression spring is coiled to wind around an outer surface of the upstanding cylindrical sleeve of the movable tank-side closure.

30. The tank-venting system of claim 29, wherein the multi-stage flow controller further includes a canister-side vapor-flow regulator mounted for movement in the canister-side chamber toward and away from the tank-side vapor-flow regulator and a movable armature mounted for up-and-down movement in an armature-receiving channel bounded by an inner surface of the upstanding cylindrical sleeve of the movable tank-side closure relative to the stationary perforated partition plate between a closed position extending through the first vent to engage the canister-side vapor-flow regulator while the canister-side vapor-flow regulator engages the second-side surface of the stationary perforated partition plate to close the first vent and several opened positions disengaging the canister-side vapor-flow regulator to allow pressurized fuel vapor extant into the tank-side chamber to flow through the first vent to the canister-side chamber.

31. The tank venting system of claim 26, wherein the multi-stage flow controller further includes a canister-side vapor-flow regulator mounted for movement in the canister-side chamber relative to the valve housing toward and away from the tank-side vapor-flow regulator to regulate flow of pressurized fuel vapor through the first vent formed in the stationary perforated partition plate, and wherein the hollow flow-management unit includes a second valve-housing closure coupled to the opposite bottom end of the boundary wall to close the bottom aperture and establish the canister-side chamber in the interior region of the valve housing between the stationary perforated partition plate and the second valve-housing closure.

32. The tank venting system of claim 26, wherein the canister-side vapor-flow regulator includes a movable canister-side closure and a canister-side compression spring having a first end engaging the movable canister-side closure and an opposite second end acting against the second valve-housing closure normally to urge the movable canister-side closure to engage the second-side surface of the stationary perforated partition plate to regulate flow of fuel vapor through the first vent formed in the stationary perforated partition plate.

33. The tank venting system of claim 26, wherein the canister-side vapor-flow regulator includes a fuel-vapor flow restrictor formed to include a small-diameter vapor-flow orifice aligned to communicate with the first vent when the fuel-vapor flow restrictor is moved in the canister-side chamber to engage the second-side surface of the stationary perforated partition plate and a canister spring located in the canister-side chamber and arranged to act against the second valve-housing closure normally to urge the fuel-vapor flow restrictor to move toward the stationary perforated partition plate to cause an annular topside of the fuel-vapor flow restrictor to engage an annular portion of the second-side surface of the stationary perforated partition plate surrounding the first vent to establish a sealed connection therebetween and occlude a portion of the first vent to compel that any pressurized fuel vapor flowing between the tank-side and canister-side chambers flow through the small-diameter vapor-flow orifice formed in the fuel-vapor flow restrictor.

34. A tank venting system comprising

A hollow flow-management unit adapted to conduct fuel vapor back and forth between a fuel vapor back and forth between a fuel tank and a fuel-vapor recovery canister, the hollow flow-management unit including a vapor conduit including a tank pipe formed to include a tank passageway, associated with the fuel tank, a canister pipe formed to include a canister passageway associated with the fuel-vapor recovery canister, and a valve housing formed to include a medial vapor-transfer passageway interconnecting the tank and canister passageways in fluid communication, and A fuel tank isolation valve located in the medial vapor-transfer passageway and configured to regulate flow of fuel vapor in the medial vapor-transfer passageway between the tank and canister passageways, the fuel tank isolation valve including a stationary perforated partition plate coupled to the valve housing to partition the medial vapor-transfer passageway to establish a tank-side chamber communicating with the tank passageway on a first side of the stationary partition plate and a canister-side chamber communicating with the canister passageway on an opposite second side of the stationary partition plate, the fuel tank isolation valve further including a tank-side vapor-flow regulator mounted in the tank-side chamber to regulate flow of fuel vapor through a second vent formed in the stationary perforated partition plate to interconnect the tank-side and canister-side chambers in fluid communication, a spring-biased, solenoid-activated movable armature arranged in the tank-side chamber to extend through a armature-receiving channel formed in the tank-side vapor-flow regulator and to move relative to the tank-side vapor-flow regulator and the stationary perforated partition plate into a first vent separated from the second vent and formed in the stationary perforated partition plate, and a canister-side vapor-flow regulator mounted in the canister-side chamber to cooperate with the spring-biased solenoid-activated, movable armature to regulate flow of fuel vapor through the first vent formed in the stationary perforated partition plate.

35. The tank venting system of claim 34, wherein each of the tank-side and canister-side vapor-flow regulators and the movable armature are arranged to move in the medial vapor-transfer passageway relative to the stationary perforated partition plate and to one another along a single vertical axis that extends through the tank-side chamber, first vent, and the canister-side chamber.

* * * * *